(12) United States Patent
Lee et al.

(10) Patent No.: US 10,370,752 B2
(45) Date of Patent: Aug. 6, 2019

(54) IMPRINTING BULK AMORPHOUS ALLOYS AT ROOM TEMPERATURE

(71) Applicant: Iowa State University Research Foundation, Inc., Ames, IA (US)

(72) Inventors: Min Ha Lee, Incheon (KR); Eun Soo Park, Jeonju-si (KR); Ryan Timothy Ott, Ames, IA (US); Jürgen Eckert, Dresden (DE)

(73) Assignee: Iowa State University Research Foundation, Inc., Ames, IA (US)

( * ) Notice: Subject to any disclaimer, the term of this patent is extended or adjusted under 35 U.S.C. 154(b) by 471 days.

(21) Appl. No.: 15/093,536

(22) Filed: Apr. 7, 2016

(65) Prior Publication Data

US 2016/0298219 A1 Oct. 13, 2016

Related U.S. Application Data

(60) Provisional application No. 62/144,680, filed on Apr. 8, 2015.

(51) Int. Cl.
- *C22F 1/18* (2006.01)
- *C22F 1/08* (2006.01)
- *C22C 45/10* (2006.01)

(52) U.S. Cl.
CPC .............. *C22F 1/186* (2013.01); *C22C 45/10* (2013.01); *C22F 1/08* (2013.01)

(58) Field of Classification Search
CPC ...... C22C 33/0278; C22C 45/10; C22F 1/186
See application file for complete search history.

(56) References Cited

U.S. PATENT DOCUMENTS

| | | | | |
|---|---|---|---|---|
| 7,645,350 | B1* | 1/2010 | Kecskes | C22C 45/10 148/403 |
| 2008/0155839 | A1* | 7/2008 | Anderson | B25G 1/10 30/350 |
| 2010/0098967 | A1* | 4/2010 | Schroers | C22C 45/00 428/600 |
| 2013/0333814 | A1* | 12/2013 | Fleury | B22D 18/06 148/561 |

OTHER PUBLICATIONS

R. Shivpuri and S.L. Semiatin, Friction and Wear of Dies and Die MaterialsFriction, Lubrication, and Wear Technology, vol. 18, ASM Handbook, (Year: 1992).*

Lee, et al., "Effect of prestaining on the deformation and fracture behavior of Zr44Ti11Cu9.8Ni10.2Be25," Intermetallics, vol. 18, available online Mar. 25, 2010, pp. 1902-1907.

(Continued)

*Primary Examiner* — Colleen P Dunn
*Assistant Examiner* — Nicholas A Wang
(74) *Attorney, Agent, or Firm* — Shumaker & Sieffert, P.A.

(57) ABSTRACT

A technique is disclosed for straining an amorphous alloy at ambient temperature to plastically and homogeneously deform the amorphous alloy, such that at least an exterior surface of the deformed amorphous alloy is substantially free of shear bands. An amorphous alloy may be strained at a rate of less than about $9 \times 10^{-5}$ s$^{-1}$ or by multiple passes of cold rolling. A pattern from a die may be imprinted into the amorphous alloy when strained, and the amorphous alloy may be used as a die to plastically strain other materials.

10 Claims, 18 Drawing Sheets

(56) References Cited

OTHER PUBLICATIONS

Lee, et al., "Influence of viscous flow on the deformation behavior of bulk metallic glassy alloys in supercooled liquid region," Intermetallics, vol. 30, available online May 7, 2012, pp. 72-75.
Lee, et al., "Improved plasticity of bulk metallic glasses upon cold rolling," Scripta Materialia, vol. 62, available online Jan. 18, 2010, pp. 678-681.

* cited by examiner

IMPRINTING BULK AMORPHOUS ALLOYS AT ROOM TEMPERATURE

This application claims the benefit of U.S. Provisional Application No. 62/144,680 filed Apr. 8, 2015, which is incorporated herein by reference in its entirety.

STATEMENT OF GOVERNMENT INTEREST

This invention was made with Government support from a grant under Contract No. DE-AC02-07CH11358, provided by the U.S. Department of Energy, Office of Basic Energy Sciences, Division of Materials Sciences and Engineering. The Government has certain rights in the invention.

TECHNICAL FIELD

The disclosure is directed to techniques for modifying amorphous alloys.

BACKGROUND

Thermo-mechanical forming and shaping treatments are well known for crystalline metallic alloys, such as steel or brass, in order to exploit these materials for various engineering applications. However, the surface roughness of grains in crystalline metallic alloys may limit their suitability in some applications.

SUMMARY

The present disclosure is directed to techniques for forming and imprinting patterns into amorphous alloys at room temperature. The disclosed techniques may induce homogeneous plastic deformation in amorphous alloys, such that the amorphous alloys remain substantially free of shear bands, slip steps, or cracks. In some examples, an amorphous alloy may be subjected to uniaxial compressive or cyclic loading at a slow strain rate, e.g., less than about $9 \times 10^{-5}$ s$^{-1}$, to plastically deform the amorphous alloy. In other examples, an amorphous alloy may be cold rolled in a plurality of passes to reduce the thickness of the amorphous alloy, e.g., by between about 0.1% and about 1% each pass, to imprint a particular shape in the amorphous alloy. A first die having sufficient yield strength may be utilized in straining and imparting one or more cavities (e.g., a rectangular pattern) in the amorphous alloy. The disclosed techniques may be applied to various types of amorphous alloys, such as metallic glasses with glass transitions or amorphous alloys without glass transitions.

In some examples, an amorphous alloy formed according to the techniques of this disclosure may serve as a second die used to imprint precise patterns in other materials, such as other amorphous alloys or metals. An amorphous alloy die formed according to the techniques of this disclosure may, for example, form more finely defined edges and have a longer life cycle, as compared to crystalline alloy or brittle amorphous alloy dies formed by other techniques.

In some examples, the disclosure is directed to a technique including straining an amorphous alloy at about 25° C. to plastically and homogeneously deform at least a portion of the amorphous alloy, such that at least an exterior surface of the deformed amorphous alloy is substantially free of shear bands. In some of these examples, straining an amorphous alloy may include straining the amorphous alloy at a strain rate of less than about $9 \times 10^{-5}$ (1/second). In other implementations, straining an amorphous alloy may include cold rolling the amorphous alloy through a plurality of passes to reduce a thickness of the amorphous alloy, wherein each pass of the plurality of passes reduces the thickness of the amorphous alloy by less than about 2%. In some examples, straining the amorphous alloy may include using a first die to form one or more cavities in the amorphous alloy. In some further examples, wherein a plastically and homogenously deformed amorphous alloy may form a second die, a disclosed technique may include plastically deforming a second material with the second die.

The details of one or more examples are set forth in the accompanying drawings and the description below. Other features, objects, and advantages will be apparent from the description and drawings, and from the claims.

DETAILED DESCRIPTION

The present disclosure is directed to techniques for forming and imprinting patterns into amorphous alloys at room temperature. Under certain conditions, amorphous alloys may exhibit brittle behavior when strained at room temperature. For example, Fe-based and Hf-based amorphous alloys may exhibit brittle behavior with no macroscopic plasticity when strained at certain strain rates at room temperature, while other amorphous alloys (such as Zr-based or Pt-based alloys) may exhibit large plastic strains in compression, bending, or under high confining pressure.

The brittle nature of certain amorphous alloys at room temperature may be overcome with the techniques described herein, which induce homogeneous plastic flow that leaves at least an exterior surface of the amorphous alloy substantially free of shear bands or fracture at room temperature. For example, amorphous alloys (e.g., certain bulk metallic glasses) that typically exhibit brittle behavior at room temperature may be imprinted and patterned by cold-plastic deformation via homogeneous plastic flow at room temperature without shear fracture. As shown by test results described in relation to various examples set forth below, straining, for example, uniaxial compression, of amorphous alloys performed at room temperature may impart macroscopic plastic deformation with a substantial lack (lack or near lack) of slip steps (characteristic of shear bands), at least on an exterior surface of the amorphous alloy. Thus, according to various example techniques, the absence of typical inhomogeneous deformation mechanisms enables room temperature imprinting and patterning of amorphous alloys.

Figure 1:
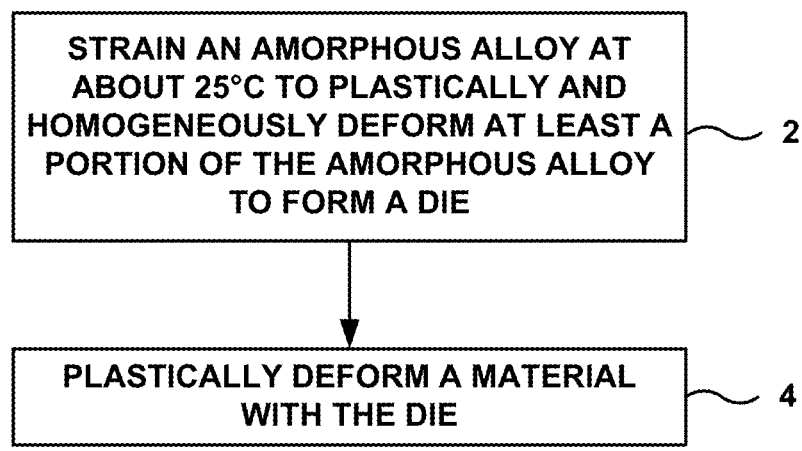
FIG. 1 is a flow diagram illustrating an example technique of this disclosure.

FIG. 1 is a flow diagram illustrating an example technique of this disclosure. In some examples, an example technique may include straining an amorphous alloy at room temperature to plastically and homogeneously deform at least a portion of the amorphous alloy, with reference to step 2. As used in this disclosure, room temperature or ambient temperature may refer to temperatures from about 18° C. to about 26° C., or from about 20° C. to about 25° C., or about 24.85° C. (298 Kelvin (K)). In some examples, upon straining the amorphous alloy in this manner, with reference to step 2, at least an exterior surface of the deformed amorphous alloy may be substantially free (e.g., nearly free or free) of shear bands, slip steps, or other cracks. Further, in some examples, a larger portion of an amorphous alloy, including an entirety of the amorphous alloy, may be homogenously deformed and substantially free of shear bands, slip steps, or other cracks, according to the disclosed techniques.

Amorphous alloys that may be strained according to the disclosed techniques may include, for example, metallic glasses exhibiting a glass transition at a glass transition temperature ($T_g$). In some examples, the disclosed techniques may allow homogenous deformation while suppressing localized shear bands in amorphous alloys that have $T_g$ values ranging from about 200° C. to about 700° C., for example a $T_g$ greater than about 100° C. Example metallic glasses that may be strained in the described manner include, without limitation, copper (Cu), nickel (Ni), hafnium (Hf), or zirconium (Zr) metallic glasses.

In other examples, amorphous alloys that substantially lack a glass transition—for example, amorphous alloys that lack a glass transition or for which a glass transition may not be clearly defined—also may be strained homogeneously according to techniques of this disclosure. Amorphous alloys that are plastically and homogeneously strained according to the techniques of this disclosure may take a number of forms, such as (without limitation), films, ribbons, discs, sheets, rods, or bulk form. In some examples, bulk amorphous alloy samples utilized in the disclosed techniques may have at least one dimension (e.g., a thickness) (or all dimensions) that is greater than 1 mm in length. Example amorphous alloys that substantially lack a glass transition to which the disclosed techniques may be applied include, without limitation, iron (Fe) or aluminum (Al), Pt, Pd, La, or Ce.

In this disclosure, in some examples, an amorphous alloy or metallic glass may be described as being based on a particular element. In these examples, the element on which a metallic glass is "based" indicates that that element is present in a highest atomic percentage (at. %) within the metallic glass compared to other atomic elements. For example, for a Hf-based metallic glass as described herein, the element hafnium is present in the highest atomic percentage in the alloy.

An amorphous alloy formed and/or imprinted according to the techniques of this disclosure may have more sharply defined patterns and edges as compared to, for example, the rougher edges formed in patterned crystalline alloys. In some examples, an amorphous alloy imprinted or patterned according to disclosed techniques may then be used as a die to imprint well-defined shapes and patterns into other materials. For example, amorphous alloy dies formed according to disclosed techniques may be used to imprint precision parts. In some examples, dies formed of amorphous alloy material may have a longer life cycle (e.g., undergo a greater number of compression cycles) as compared to crystalline alloy dies, the latter of which may be more susceptible to, e.g., cracking or fracture of crystals due to shear forces along their edges.

Further, amorphous alloys strained according to the disclosed techniques may exhibit enhanced plasticity, including enhanced homogeneous flow, at room temperature (e.g., about 25° C.), as compared to other methods of straining amorphous alloys. Accordingly, in some examples, straining an amorphous alloy at about room temperature to plastically and homogeneously deform at least a portion (or all) of the amorphous alloy may include straining the amorphous alloy at a strain rate from about $1 \times 10^{-9}$ s$^{-1}$ to about $9 \times 10^{-5}$ s$^{-1}$, such as at about $1.5 \times 10^{-5}$ s$^{-1}$. In examples, the amorphous alloy (such as a Hf-based amorphous alloy) may be loaded by any suitable manner, such as uniaxial compressive or uniaxial cyclic loading. Moreover, straining an amorphous alloy in this manner may include continuously or intermittently applying a force between about 50% and about 95% of the yield strength of the amorphous alloy, such as between about 70% and about 95%, for example about 75% of the yield strength, to plastically and homogeneously deform the amorphous alloy in the described manner.

According to such techniques, amorphous alloys may plastically deform in a manner that leaves at least an exterior surface (or, e.g., an entirety of the amorphous alloy) substantially free (e.g., free or nearly free) of shear bands, slip steps, or cracks. Thus, amorphous alloys that may typically exhibit brittle behavior upon being strained at room temperature may be controlled to undergo homogenous plastic flow. In this way, strained amorphous alloys may be substantially free of localized and narrow shear bands that may lead to catastrophic failure. Further, amorphous materials that undergo homogenous plastic flow according to described techniques may exhibit enhanced properties (e.g., strength) or fewer imperfections in their exterior surfaces as compared to amorphous alloys that exhibit enhanced plasticity due to inhomogeneous plastic flow. In some examples, deformation in amorphous alloys (e.g., homogeneous deformation) is dependent on both strain rate and temperature. Thus, a ratio of test temperature to glass transition temperature ($T/T_g$) for an amorphous alloy may be considered. This ratio may be referred to as a "reduced temperature."

For example, some slowly strained amorphous alloys that have a low aspect ratio (height/diameter) (e.g., about 0.9) may exhibit enhanced plasticity, yet deform inhomogeneously via shear localization. In such an example, the plastic flow in the amorphous alloy may be inhomogenous in that strain is distributed over multiple shear bands to achieve enhanced plasticity. In comparison, in some examples plastic deformation techniques of this disclosure, amorphous alloys (such as metallic glasses) may deform homogeneously without showing localization of strain beyond the atomic scale.

In some examples, amorphous alloys may be homogeneously deformed upon heating the amorphous alloys into or near a supercooled liquid region, to utilize a viscous flow behavior of the material at elevated temperatures. In some of these examples (among others), amorphous alloys may exhibit embrittlement upon being thermoplastically formed. However, the disclosed techniques may homogenously and plastically deform an amorphous alloy at room temperature while suppressing shear localization, such that at least an exterior surface of the amorphous alloy remains substantially free of shear bands or slip steps. For example, an amorphous alloy may be strained with a die to imprint a precisely defined pattern into the amorphous alloy, without the need for a heating step. Amorphous alloys that can be strained according to the disclosed techniques may include metallic glasses and amorphous alloys that substantially lack a glass transition. In some examples, the described techniques may be applied to bulk amorphous alloys that have a thickness greater than 1 millimeter (mm). Further, amorphous alloys strained according to the disclosed techniques may avoid embrittlement that occurs with thermoplastic forming.

As described above, in some examples, a die may be utilized in straining and imprinting one or more cavities (e.g., a pattern) into an amorphous alloy at the selected strain rate. For example, a die may be disposed in between the amorphous alloy and a platen of an apparatus configured to uniaxially compress or cyclically load the amorphous alloy, such that the die imparts a desired shape or pattern in the amorphous alloy by plastically deforming the amorphous alloy at the selected strain rate.

Figure 2:
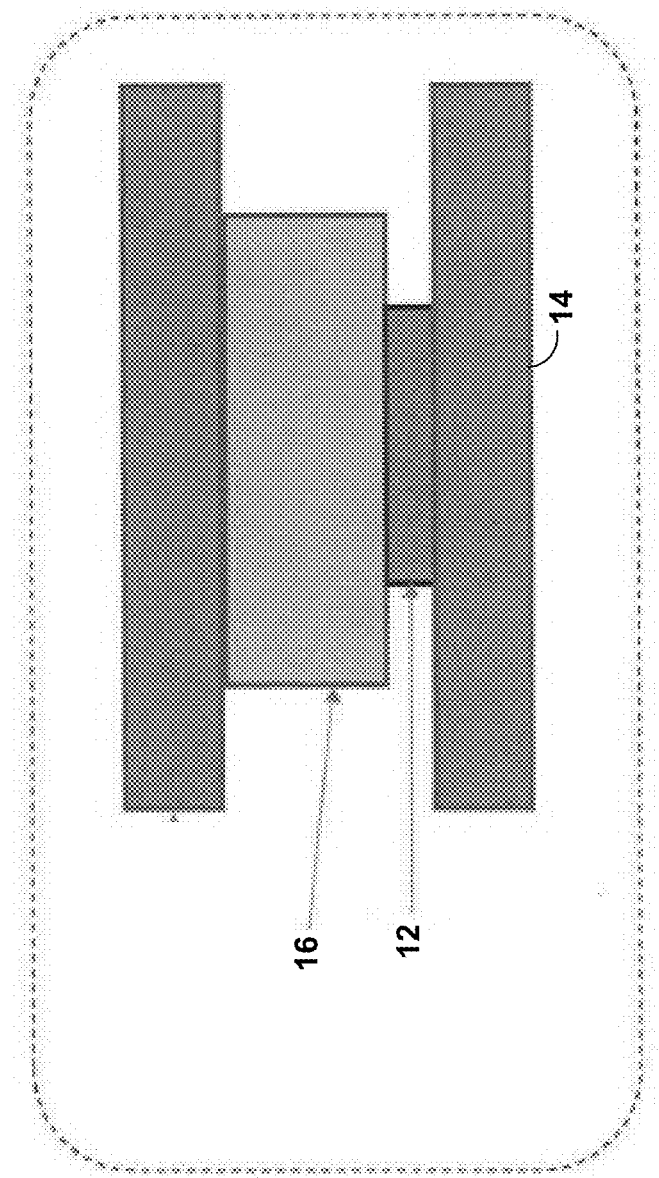
FIG. 2 is a conceptual diagram illustrating a straining apparatus including a die used to cold-plastic pattern an amorphous alloy sample.

FIG. 2 is a conceptual diagram illustrating a straining apparatus including a die used to cold-plastic pattern an amorphous alloy sample. In an example, at least one die 12 is placed between an amorphous alloy 16 and a platen 14 of a straining apparatus such that a particular geometry or pattern of die 12 is imprinted into amorphous alloy 16 when a straining apparatus strains (e.g., compresses) amorphous alloy 16. While the example straining apparatus of FIG. 2 shows one die 12 placed between a lower platen 12 and a bottom portion of amorphous alloy 16, in other examples, more than one die may be placed between platen 12 and amorphous alloy 16. Additionally or alternatively, a die may be placed between a top portion of amorphous alloy and a bottom portion of an upper platen to imprint geometries on an opposing surface of amorphous alloy 16.

In general, at least one die 12 utilized in straining an amorphous alloy may include a plurality of protrusions and/or a plurality of openings or cavities, such that a particular geometry may be imparted on amorphous alloys die 12 imprints. For example, die 12 may include one or more shapes formed in a pattern, such as at least one of squares, rectangles, circles, diamonds, waves, or the like. Moreover, in the techniques disclosed herein, a variety of thicknesses and dimensions of protrusions, openings, or cavities may be suitable, depending on the application. Thus, protrusions in die 12 impart cavities (such as a pattern) in an amorphous alloy when the alloy is strained.

In some examples, die 12 may include tungsten (W). Additionally or alternatively, other materials with sufficient strength and/or hardness to imprint amorphous alloys may be selected for die 12, such as at least one of molybdenum (Mo), ruthenium (Ru), carbon (C), carbon nanotubes, carbon fiber, or graphene. In some examples, the one or more materials of die 12 may have a respective or combined yield strength between about 500 and about 2,500 megapascals (MPa). Moreover, in some examples, platen 14 of a straining apparatus may include tungsten carbide (WC), or any other suitable material that is sufficiently strong and/or hard to induce compression of a sample without failure.

In an example, a first die (such as die 12 of FIG. 2) composed of a first material (such as tungsten) may be used to imprint a pattern into the amorphous alloy. The patterned amorphous alloy itself may then be used as a second die to plastically deform an inverse of the pattern into a second material at ambient temperature (about 25° C.), or other temperatures. One or more protrusions in the amorphous alloy die may impart one or more respective cavities in the second material.

Thus, in some examples, straining an amorphous alloy to plastically and homogenously deform at least a portion of the amorphous alloy (with reference to step 2 of FIG. 1) may include straining the amorphous alloy by using a die to form one or more cavities in the amorphous alloy.

In an example, a technique of this disclosure may further include plastically deforming a material with an amorphous alloy die to form one or more cavities (e.g., a pattern) in the material, with reference to step 4 of FIG. 1. In some examples, the amorphous alloy die may imprint other materials at ambient temperature (about 25° C.), although other temperatures may be utilized. For example, a patterned amorphous alloy die may be disposed between a platen of a straining apparatus and another material then placed under uniaxial or cyclic compression at ambient temperature (or other temperatures) to imprint the second material. Amorphous alloys utilized as dies may impart specific and sharply defined geometries into other materials and leave the exterior surface of the materials substantially free of imperfections (e.g., free or nearly free), such as substantially free of shear bands or misaligned dimensions, due at least to the mechanical properties (e.g., strength) of amorphous alloys and their lack of grain boundaries. In comparison, grains in crystalline metallic dies may impart roughness on exterior surfaces of imprinted materials, making such dies less suitable for certain applications, such as high precision parts. For example, in some instances, shear bands and slip steps on exterior surfaces may serve as sites for the onset of corrosion. Moreover, plastically and homogeneously deformed amorphous alloy dies may provide enhanced strength and durability over crystalline metal dies (and other types of dies). Thus, such amorphous alloy dies may undergo more compression cycles than crystalline metal dies without observable, wear, fracture or failure.

Various materials may be imprinted by an amorphous alloy die, such as, for example, metals or other amorphous alloys. For example, a bulk amorphous alloy die may imprint desired geometries into Cu foil or a Zirconium (Zr)-based metallic glass.

Figure 3:
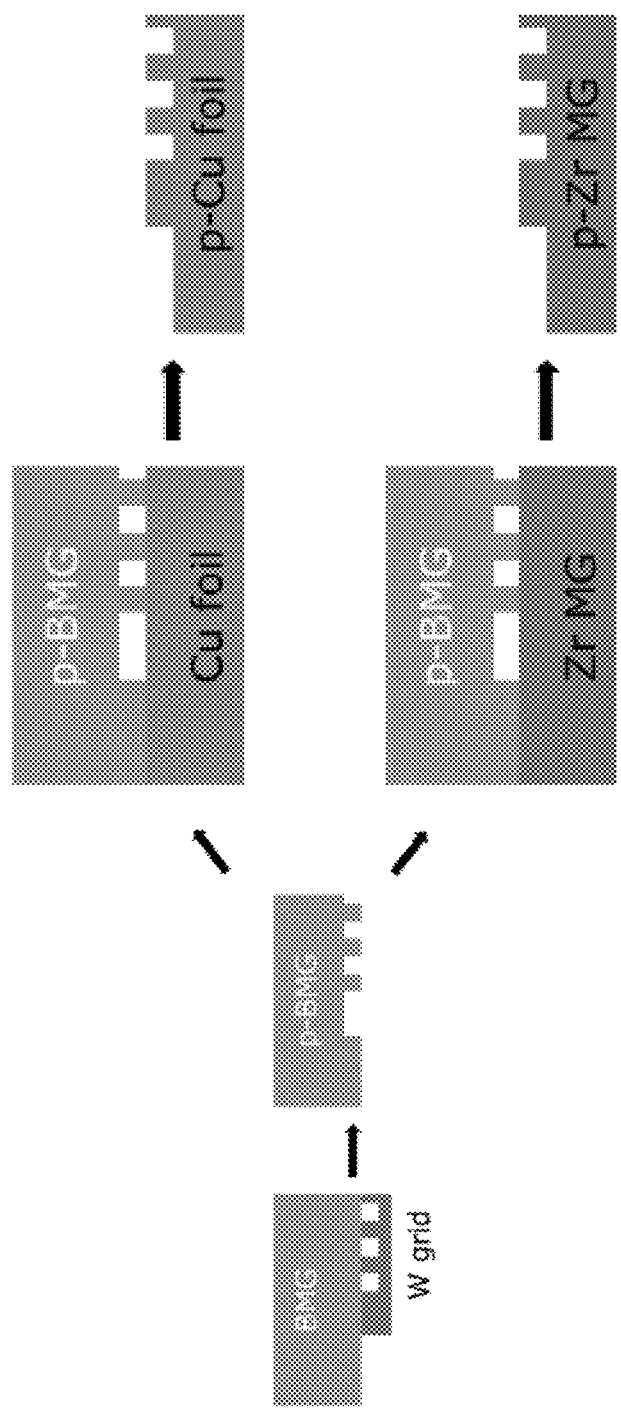
FIG. 3 is a schematic diagram illustrating an example technique of forming a patterned bulk metallic glass die and imprinting other materials with the patterned bulk metallic glass die.

FIG. 3 is a schematic diagram illustrating an example technique of forming a patterned bulk metallic glass die and imprinting other materials with the patterned bulk metallic glass die. As shown in FIG. 3, and according to techniques described above, a bulk metallic glass (BMG) may be strained to plastically and homogeneously deform the BMG with a tungsten die including a pattern (W grid). For example, the BMG may be strained at a rate less than about $9 \times 10^{-5}$ s$^{-1}$. The BMG may be imprinted by, for example, uniaxially or cyclically compressing the tungsten die into the BMG at the selected slow strain rate, resulting in a patterned BMG (p-BMG) with at least an exterior surface (or entirety) that is substantially free of shear bands, slip steps, cracks, or other imperfections. The patterned bulk metallic glass may then be used as a die to impart shapes into other materials. As shown in FIG. 3, for example, Cu foil or Zr-based metallic glass may be imprinted by the p-BMG, forming patterned Cu foil (p-Cu foil) and patterned Zr-based metallic glass (p-Zr MG), respectively.

In some examples, straining an amorphous alloy at ambient temperature to plastically and homogeneously deform at least a portion of the amorphous alloy, such that at least an exterior surface of the deformed amorphous alloy is substantially free of shear bands (as described above), may include cold rolling an amorphous alloy through a plurality of passes to reduce a thickness of the amorphous alloy. In some examples, an entirety of an amorphous alloy strained using the described cold rolling techniques may be homogeneously deformed and substantially free of shear bands. Amorphous alloys utilized in cold rolling examples may be similar to or the same as amorphous alloys described in other examples above. In general, certain aspects of examples of straining an amorphous alloy using cold rolling may include similar or the same features as examples of straining using uniaxial or cyclic loading, unless otherwise noted.

Figure 4:
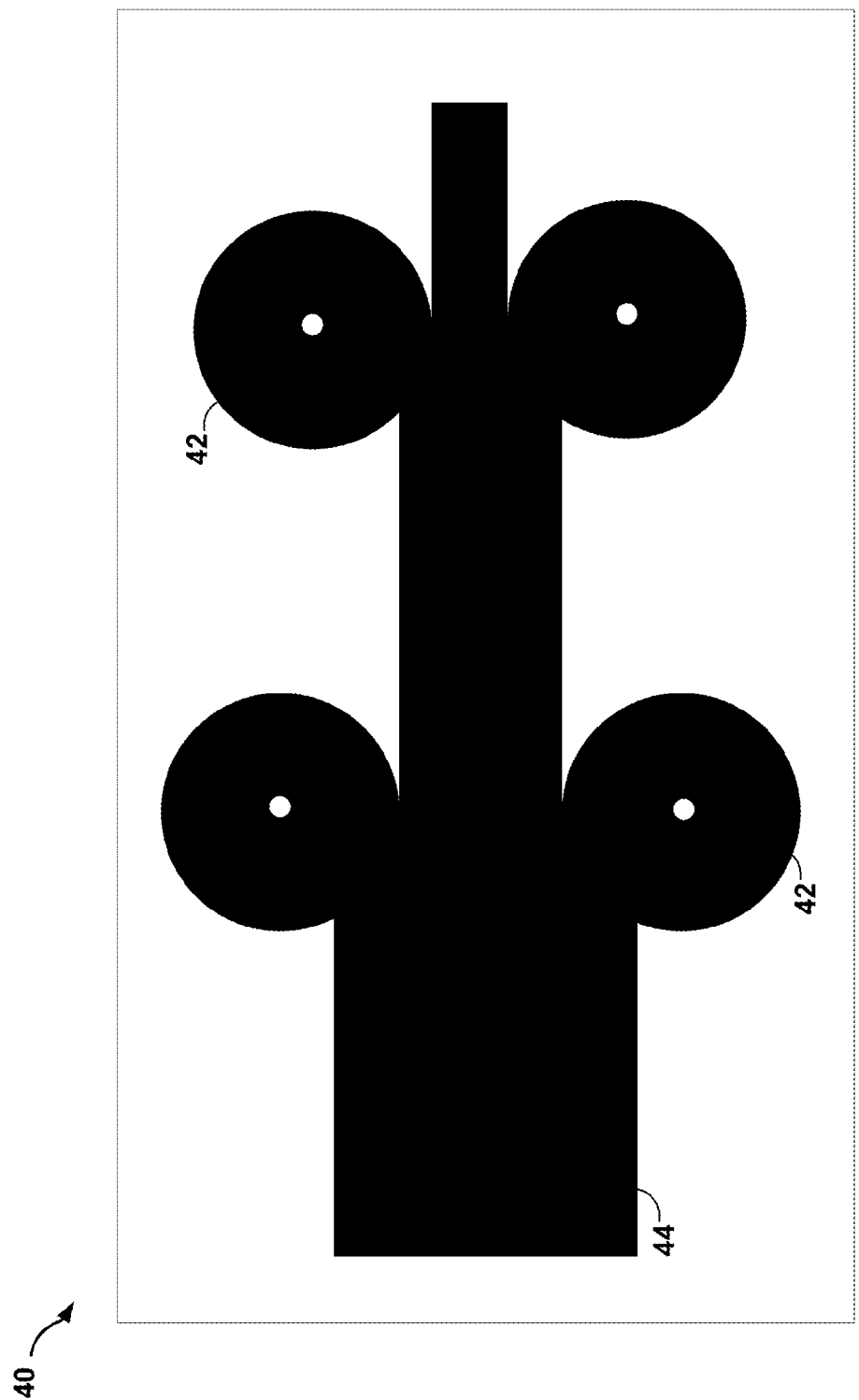
FIG. 4 is a conceptual diagram illustrating an example cold rolling apparatus for reducing the thickness of an amorphous alloy.

FIG. 4 is a conceptual diagram illustrating an example cold rolling apparatus for reducing the thickness of an amorphous alloy. As shown in FIG. 4, an example cold rolling apparatus 40 includes rollers 42 that may reduce the thickness of an amorphous alloy 44 as it passes through a plurality of passes. Although two passes are shown in example cold rolling apparatus 40, other numbers of multiple passes may be utilized in the disclosed techniques. In some examples, each pass of the plurality of passes may reduce a thickness of the amorphous alloy by less than about 2%, for example, by between about 0.1% and about 1%, leaving at least an exterior surface (or entirety) of the amorphous alloy substantially free (e.g., free or nearly free) of shear bands. Further, in some implementations, the plurality of passes of cold rolling may reduce the overall thickness of the amorphous alloy by less than about 45%, for example less than 33%.

Further, in some examples, amorphous alloy 44 may be maintained in a strained condition between each pass of cold rolling. For example, amorphous alloy 44 may be lapped by Cu foil, and the sample and Cu foil may be sandwiched between stainless steel plates. The resulting plastic deformation maintains the amorphous alloy 44 in a strained condition between passes.

In some examples, one or more dies (e.g., die 12 as described above) may be disposed between amorphous alloy 44 and one or more rollers 42 of cold rolling apparatus 40 prior to passing amorphous alloy 44 through rollers 42. For example, a sheet including a die (e.g., a plurality of protrusions) may be placed on a desired surface of a sheet of amorphous alloy 44, such that the protrusions of the die imprint themselves into an exterior surface of amorphous alloy 44 as the sheet including the die and the sheet of amorphous alloy 44 pass through and are compressed together through rollers 42. Additionally or alternatively, dies may be affixed to or formed on rollers 42 themselves. As described above, the one or more dies utilized in these example techniques may include geometries or patterns to be imprinted into amorphous alloy 44 as amorphous alloy 44 passes through rollers 42.

In some examples, prior to cold rolling, a layer of additional material may be disposed between amorphous alloy 44 and rollers 42 to lubricate and/or protect an exterior surface of amorphous alloy 44 as it passes through rollers 42. For example, prior to cold rolling amorphous alloy 44, a crystalline metallic material may be disposed between amorphous alloy 44 and one or more rollers 42 of cold rolling apparatus 40. In some of these examples, the crystalline metallic material may be disposed between amorphous alloy 44 and one or more dies (e.g., a sheet including one or more dies) used to imprint amorphous alloy 44. The crystalline metallic material may be, e.g., a copper (Cu) foil, nickel (Ni) foil, or foils of metals or alloys, such as, Zr, Mo, Ta, Al, or stainless steel, etc.

Thus, in some examples, one or more dies may be disposed between the amorphous alloy and one or more rollers of a cold rolling apparatus prior to passing through the rollers. Additionally or alternatively, dies may be affixed to or formed on the rollers themselves. Further, in some implementations, a layer of additional material may be disposed between the die and the amorphous alloy to lubricate and/or protect the surface of the amorphous alloy. For example, a copper foil may be disposed between the amorphous material and a die used to imprint a pattern into the amorphous material. The described lubricating or protective material also may serve to maintain the amorphous material in a strained state following a first and subsequent passes of cold rolling, as further described below.

In some examples, multiple layers of additional material (e.g., crystalline metallic material) may be disposed between each respective exterior surface of amorphous alloy 44 and the one or more dies applied thereto. An example crystalline metallic material, such as a Cu or Ni foil, may also serve to maintain the amorphous material in a strained state following a first and subsequent passes of cold rolling.

Thus, in one example, an amorphous alloy sample may be plastically and homogeneously strained by a die as the alloy passes through multiple stages of cold rolling, such that each pass reduces the thickness of the alloy by between about 0.1% and about 1%, and such that a pattern from the die is imprinted into the alloy. A Cu or Ni foil may be disposed between the alloy and the die prior to being continuously strained through multiple passes, for instance, preferably over 100 times, to protect and lubricate the surface of the alloy. In this way, at least the exterior surfaces of the strained amorphous alloy of reduced thickness may be substantially free of shear bands, slip steps, cracks, or other imperfections. The imprinted amorphous alloy my then be used as a die to imprint and form one or more cavities in other materials for a variety of applications, such as metals or other amorphous alloys, as described above.

EXAMPLES

As described in greater detail with reference to various examples below, example rectangular-shaped Hf-based amorphous alloy samples were strained at about 25° C. using a tungsten die to imprint a pattern into the samples. Hf-based amorphous alloy samples were prepared from an as-cast ingot having a nominal composition of $Hf_{44.5}Cu_{27}Ni_{13.5}Ti_5Al_{10}$ (at. %). A Philips APD 3520 x-ray diffractometer with monochromatic Co-Kα radiation was used to structurally characterize the samples (among samples of other materials described herein). The ingot was prepared by arc melting under an argon (Ar) atmosphere. The ingot was about 4 mm in width and 80 mm long. A diamond saw was utilized to cut 10 rectangular-shaped Hf-based amorphous alloy samples from the ingot, each sample being about 2 mm in height and about 4 mm in width (a height-to-width aspect ratio=0.5). The opposing ends of each sample (e.g., exterior surfaces configured to contact platens of compression apparatus) were polished flat and normal to a longitudinal axis of the samples, to ensure uniform loading in compression for patterning.

Example 1

Figure 5:
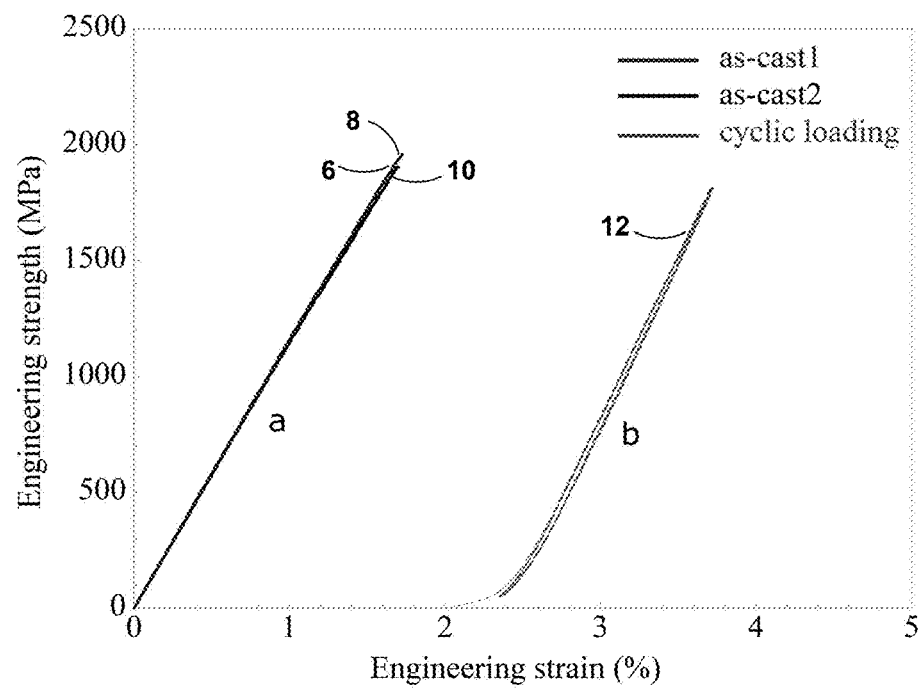
FIG. 5 is a chart illustrating engineering stress strain curves obtained from uniaxial compression and cyclic compression tests of a bulk Hafnium-based amorphous alloy performed at room temperature.

FIG. 5 is a chart illustrating engineering stress strain curves obtained from uniaxial compression and cyclic compression tests of a bulk Hafnium-based amorphous alloy performed at room temperature. Curve 6 (also designated as "as-cast 1") shown in FIG. 5 represents an engineering stress strain curve obtained from the uniaxial compression test of an as-cast Hf-based amorphous alloy with nominal composition of $Hf_{44.5}Cu_{27}Ni_{13.5}Ti_5Al_{10}$ (atomic percentage (at. %)). The Hf-based amorphous alloy had high glass-forming ability and a glass transition temperature ($T_g$) of about 848 K (about 574.85° C.). Other curves presented in FIG. 5, including curve 8, curve 10 and curve 12, also reflect testing of this Hf-based amorphous alloy.

The uniaxial compression test resulting in curve 6 was performed at room temperature on the Hf-based amorphous alloy at a constant strain rate of $3×10^{-4}$ s$^{-1}$ using an Instron testing apparatus. Curve 6 shown in FIG. 5 illustrates that the Hf-based amorphous alloy exhibits typical brittle behavior in the monolithic glassy phase under uniaxial compression and fails without any indication of macroscopic plastic strain. For example, a point of failure 8 of the Hf-based amorphous alloy along curve 6 is designated on the chart of FIG. 5. Curve 10 (also designated as "as-cast 2") shows the results of a second uniaxial compression test performed on a sample of the same alloy under the same conditions.

For the uniaxial compression testing conducted in FIG. 5, rod-shaped specimens were cast in a water-cooled copper mold with cross-sectional dimensions of about 3 mm (diameter) and about 6 mm height and micro-polished. Thus, the rod-shaped Hf-based amorphous alloy samples were prepared with a height-to-width aspect ratio of about 2. Again, the uniaxial compression tests were performed under quasi-static loading at an initial strain rate of $3×10^{-4}$ s$^{-1}$ at room temperature.

For the Hf-based amorphous alloy tested in the chart of FIG. 5, when assigning 298 K as room temperature (the test temperature), a reduced temperature of about 0.35 is obtained (298 K/848 K). A reduced temperature of 0.35 for an amorphous alloy may be considered to be within a range where plastic deformation of the alloy is typically expected to be inhomogeneous.

A plurality of curves 12 shown in the chart of FIG. 5 (also designated as "cyclic loading") show the results of a cyclic compressive deformation test performed on the rod-shaped Hf-based amorphous alloy samples using the Instron testing apparatus. Each cycle of the cyclic deformation test was performed at a constant strain rate of $1×10^{-4}$ s$^{-1}$. Plurality of curves 12 are engineering stress strain curves obtained from thirty (30) cycles of compression of the as-cast Hf-based amorphous alloy. For each cycle, the apparatus was stopped at about 90% of the maximum stress for the material without fracture. Thus, the Hf-based sample was repeatedly elastically strained below the yield stress of the Hf-based amorphous alloy (about 93% of the yield strength, 1813 MPa) under load-controlled conditions. The cyclic loading test also indicated that the compressive plasticity of the monolithic Hf-based amorphous alloy was zero under the applied conditions, confirming an intrinsic brittleness of the material under the applied conditions.

Further, as shown by curve 12, the monolithic Hf-based amorphous alloy tested exhibits a hysteresis during the cyclic loading, although the strain accumulation is almost negligible from the width of the hysteresis loop. No difference was measured between common points and unloading strain values up to 30 cycles as shown by curve 12.

Example 2

Figure 6:
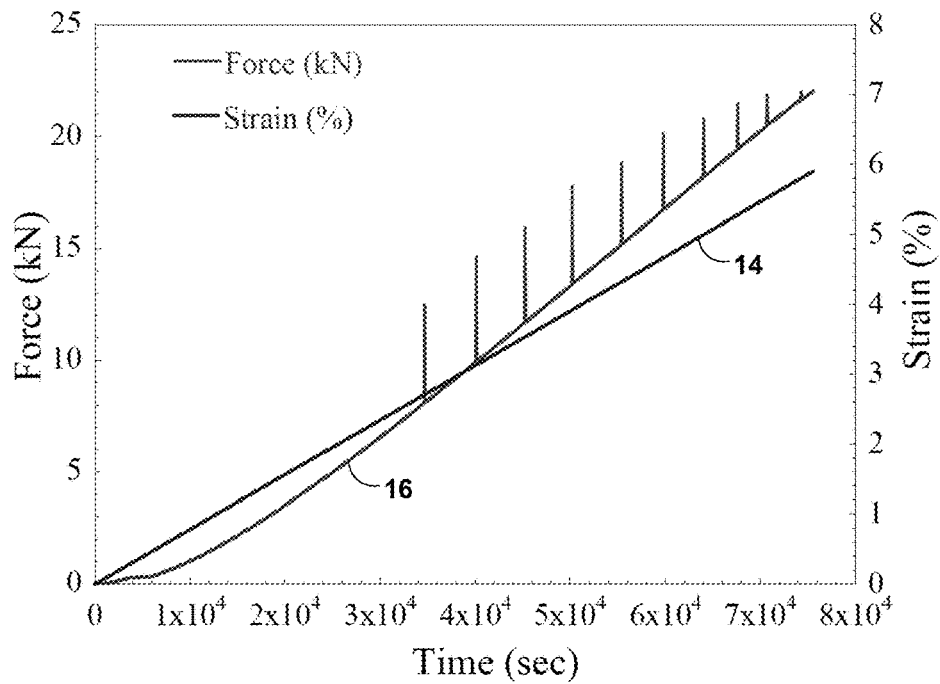
FIG. 6 is a chart illustrating load and strain from a uniaxial compressive test of the Hf-based amorphous alloy as a function of time.

FIG. 6 is a chart illustrating load and strain from a uniaxial compressive test of the Hf-based amorphous alloy as a function of time. Again, the amorphous alloy tested had a nominal composition of $Hf_{44.5}Cu_{27}Ni_{13.5}Ti_5Al_{10}$ (at. %). Curve 14 in FIG. 6 shows a strain percentage (%) of the sample as a function of time (seconds (s)). Curve 14 shows that strain on the sample increased continuously without fluctuation as time elapsed. Curve 16 of FIG. 3 displays force or load (in kilo-Newtons (kN)) applied as a function of displacement rate (1/s) for the uniaxial compressive loading for patterning. Curves 14 and 16 were obtained by continuously loading a Hf-based amorphous alloy sample up to about 75% of maximum strength (1453 MPa) at a low strain rate of $1.5×10^{-5}$ s$^{-1}$. While curve 14 resembles a typical uniaxial compressive test result of a brittle amorphous alloy without any plasticity, examination of the Hf-based amorphous sample after unloading revealed that the sample plastically compressed by about 5% in height according to measurements of the gauge length, where $h_{as-cast}$=1.55 mm (height of sample as cast) and $h_{deformed}$=1.47 mm (height of deformed sample), and $\Delta h_{deformation}$=80 microns (μm) (change in height due to plastic deformation). A total displacement measurement that is slightly larger than the actual sample deformation may be due to compliances of the testing apparatus. Signs of cracking or shear banding following unloading of the sample were not observed. Thus, the strain percentage corresponds to total displacement (plastic deformation) imparted on the sample for patterning of amorphous alloys.

Curve 16 includes a plurality of spikes, indicating spikes in the force applied by the uniaxial compressive loading apparatus (Instron) to maintain a constant strain rate of $1.5 \times 10^{-5}$ s$^{-1}$ on the Hf-based sample. The large spikes in shown in curve 16 were observed in multiple samples tested. To verify the spikes in stress were not due to fluctuations in the load frame, the stress applied as a function of time was investigated for one of the spikes shown in curve 16. For that spike, the stress showed a rapid increase followed by a duration of about 2.7 minutes with pop-up stress difference levels that varied between about 93 and about 311 MPa. This time dependence of the stress relaxation indicates that the spikes may be due to deformation-induced structural rearrangements within the Hf-based amorphous alloy. In some examples, serrated flow may correlate with atomic rearrangement or shear localization.

Example 3

Figure 7:
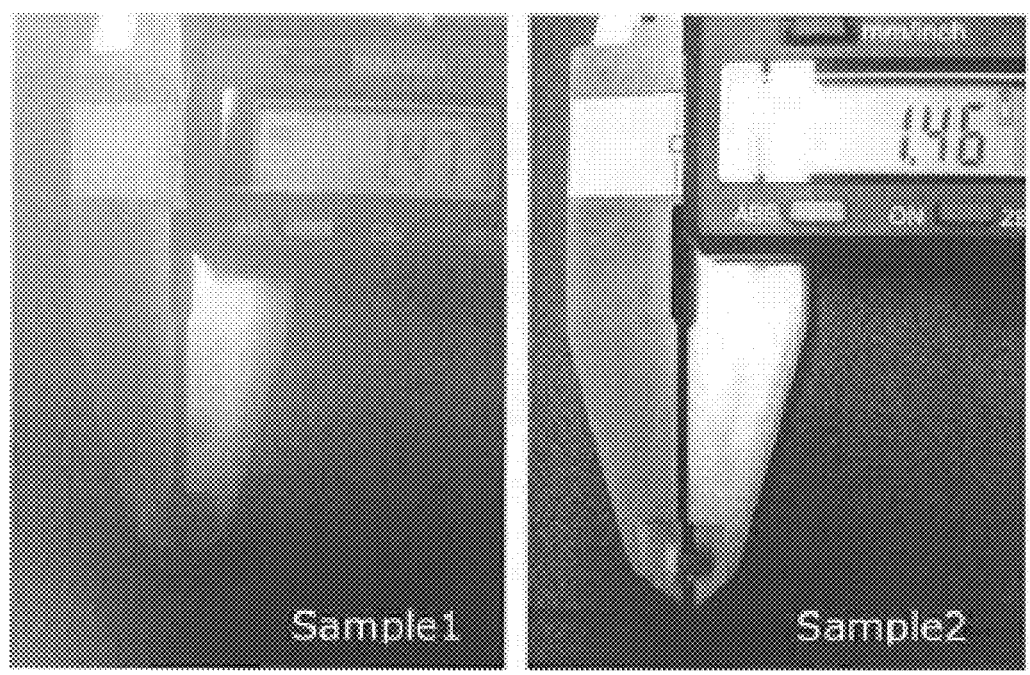
FIG. 7 illustrates optical images of two plastically deformed Hf-based amorphous alloy samples.

FIG. 7 illustrates optical images of two plastically deformed Hf-based amorphous alloy samples. As shown in FIG. 4, a first tested sample, Sample 1, had a deformed height of 1.47 mm, while a second sample tested had a deformed height of a 1.46 mm. Thus, the height of each sample was plastically compressed by about 5% of its original height (about 1.55 mm) without cracking after low strain rate, continuous compressive test.

Example 4

Figure 8:
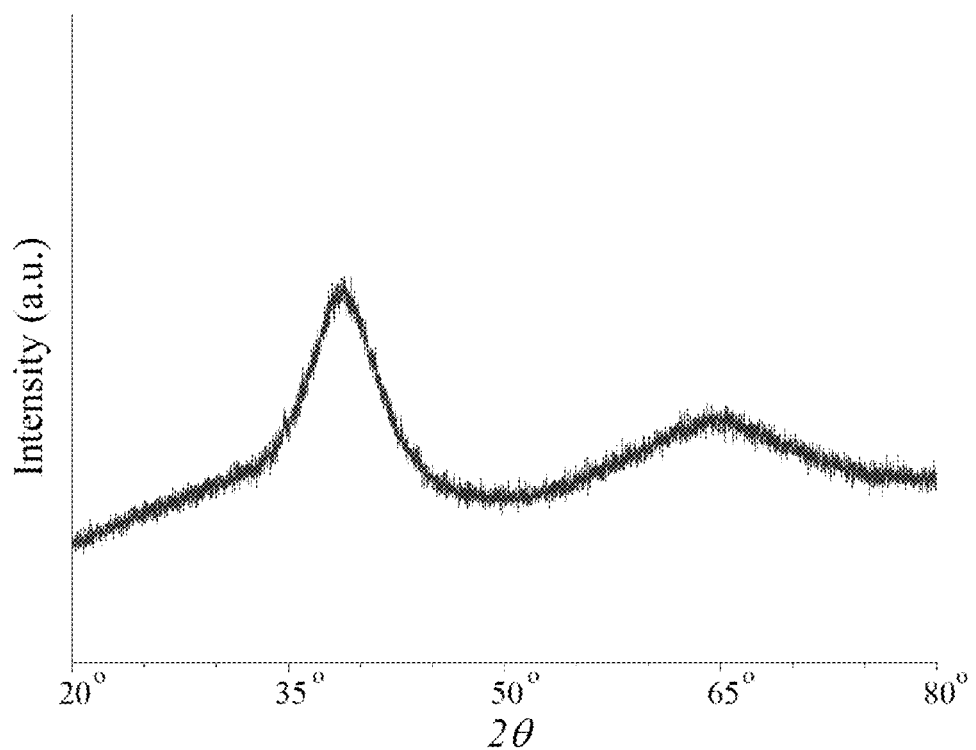
FIG. 8 is a chart illustrating an x-ray diffraction pattern obtained from the Hf-based amorphous alloy sample utilized in FIG. 3.

FIG. 8 is a chart illustrating an x-ray diffraction pattern obtained from the Hf-based amorphous alloy sample utilized in FIG. 3. The x-ray diffraction (XRD) pattern was prepared using a long time scan of 2θ=0.08° per step speed. The XRD pattern displayed in FIG. 8 shows a typical broad maxima characteristic for amorphous materials, with no distinct crystalline peaks detected within the sensitivity limits of the XRD. Accordingly, the nature of the Hf-based amorphous alloy may not transform during deformation or cold-patterning (e.g., at room temperature) processing.

Example 5

Figure 9A:
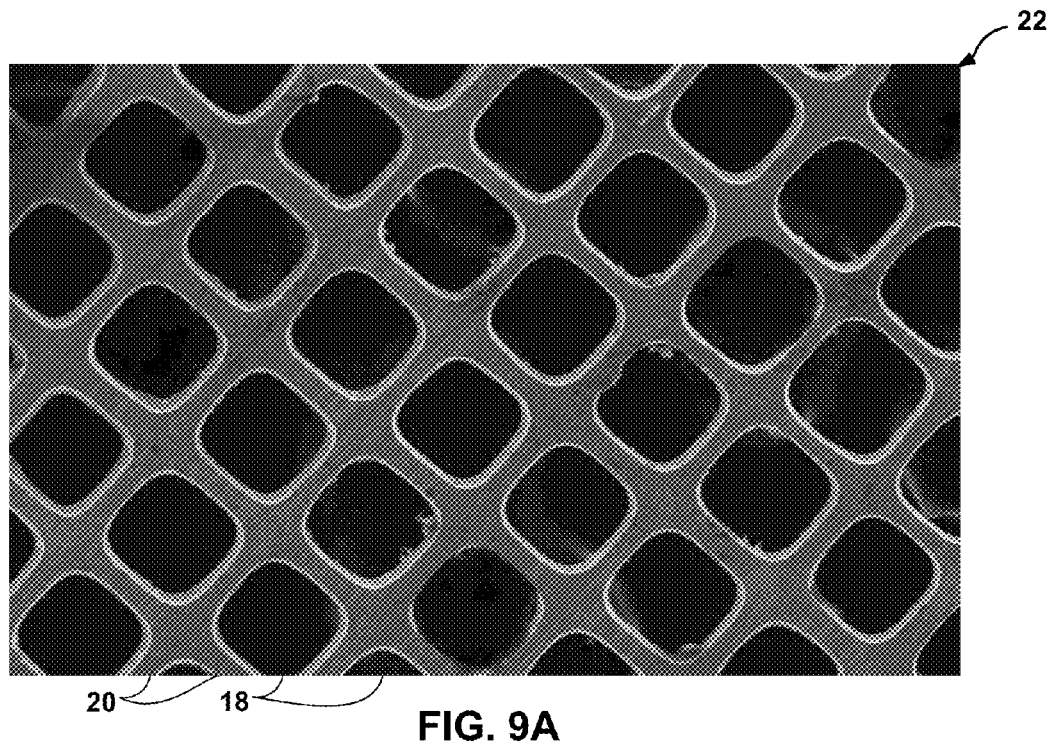
FIG. 9A is a scanning electron microscope (SEM) secondary electron image of a tungsten die including a patterned grid.
Figure 9B:
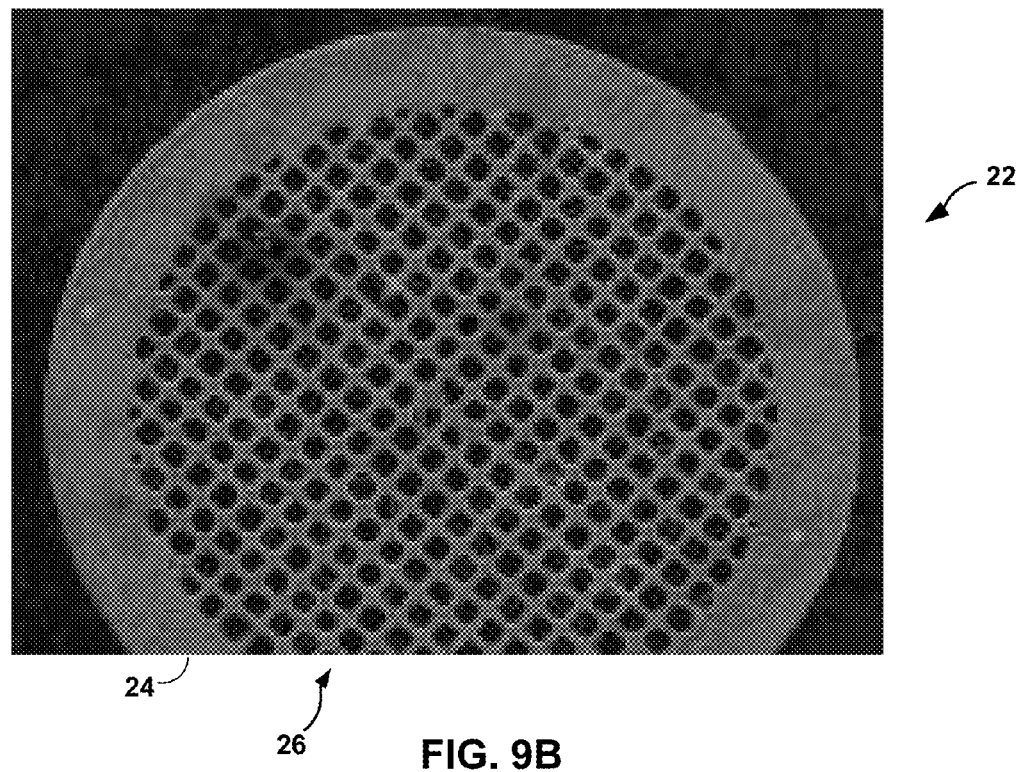
FIG. 9B is macroscopic overview of an SEM secondary electron image of the tungsten die of FIG. 9A.

FIGS. 9A and 9B show an example tungsten die 22 utilized in the preceding examples. FIG. 9A is a scanning electron microscope (SEM) secondary electron image of tungsten die 22 including a patterned grid. For this example, tungsten die 22 was fabricated using an electro-deposition process (Pacific Grid-Tech) such that die 22 had a diameter of about 3 mm, a thickness of about 25 µm and pit spacing of about 97 µm FIG. 9B is macroscopic overview of an SEM secondary electron image of the tungsten die of FIG. 9A. The image of FIG. 9B shows the 3 mm diameter and grid pattern of tungsten die 22. The image of FIG. 9B also shows a lateral portion 24 of die 22 that has a continuously planar surface and encircles a grid portion 26 of die 22. As shown in FIGS. 9A and 9B, example tungsten die 22 includes a rectangular pattern in which square openings 18 are each about 97×97 µm$^2$ in size and struts 20 are each about 25 µm wide. Grid portion 26 of die 22 includes openings 18 and struts 20.

Sample 28 of the rectangular-shaped Hf-based amorphous alloy was loaded in the described Instron apparatus with the tungsten die 22 disposed between a WC platen of the Instron apparatus and the sample. The Instron apparatus strained sample 28 with tungsten die 22 under uniaxial compression loading at a strain rate of $1.5 \times 10^{-5}$ s$^{-1}$. Sample 28 was loaded up to about 75% of the yield strength of the alloy (e.g., up to about 1453 megapascals (MPa)), at which time the load was immediately removed. In this example, compression of sample 28 at the referenced strain rate up to the referenced yield strength of Hf-based amorphous alloy sample 28 required about 21 hours.

Figure 10A:
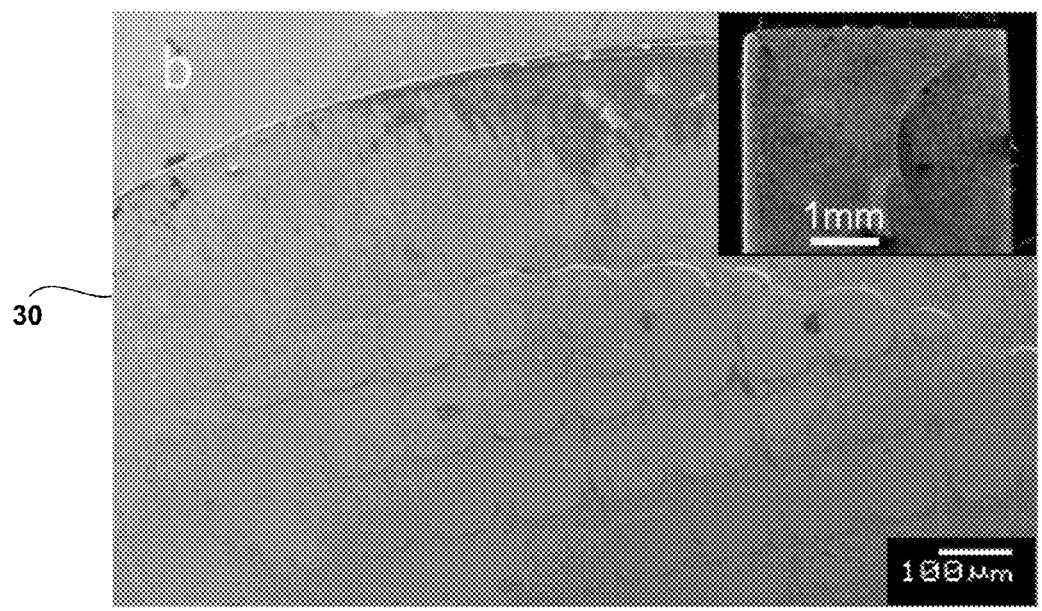
FIG. 10A is an SEM secondary electron image showing a pattern imprinted by a tungsten die on an exterior surface of a Hf-based amorphous alloy sample.

FIG. 10A is an SEM secondary electron image showing a pattern imprinted by tungsten die 22 on an exterior surface of the rectangular-shaped Hf-based amorphous alloy sample 28 referenced above. An area of about 7 mm$^2$ of sample 28 was cold-plastic formed (e.g., depressed) by uniaxial compressive loading of tungsten die 22 into sample 28 using the Instron apparatus under the conditions described above. The image of FIG. 10A shows a lateral region 30 of sample 28 deformed by lateral portion 24 of tungsten die 22. Further, the image of FIG. 10A shows well-aligned rectangular-shaped patterns with clear edges, indicating homogeneous deformation and transfer of the three-dimensional shape from tungsten die 22 to the glassy alloy sample 28 that substantially lacks evidence of shear bands or cracks. An inset image in FIG. 10A shows a macroscopic overhead view of the patterned rectangular-shaped Hf-based amorphous alloy sample 28.

Figure 10B:
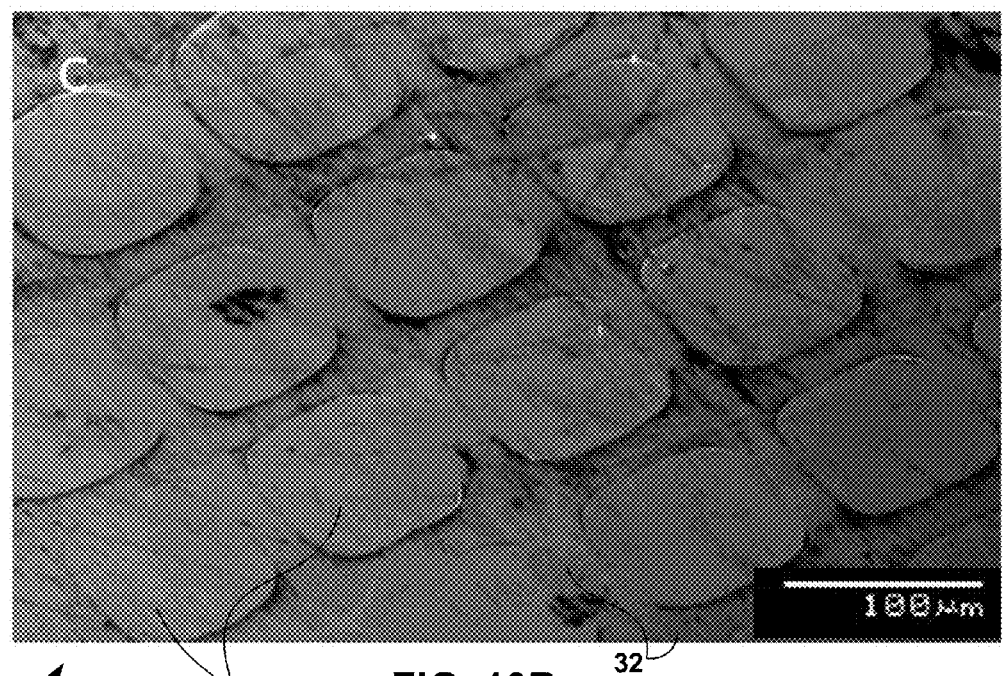
FIG. 10B is a more magnified SEM image showing rectangular patterns imprinted in the Hf-based amorphous alloy sample of FIG. 10A.

FIG. 10B is a more magnified SEM image showing rectangular patterns imprinted in the Hf-based amorphous alloy sample 28 of FIG. 10A. As shown in FIG. 10B, the rectangular patterns in sample 28 have clear, sharp edges, without shear localization. The image of FIG. 10B shows, for example, trench portions 32 of sample 28 deformed from compression by struts 20 of tungsten die 22. The image also shows, for example, rectangles 34 left by openings 18 in die 22.

Figure 10C:
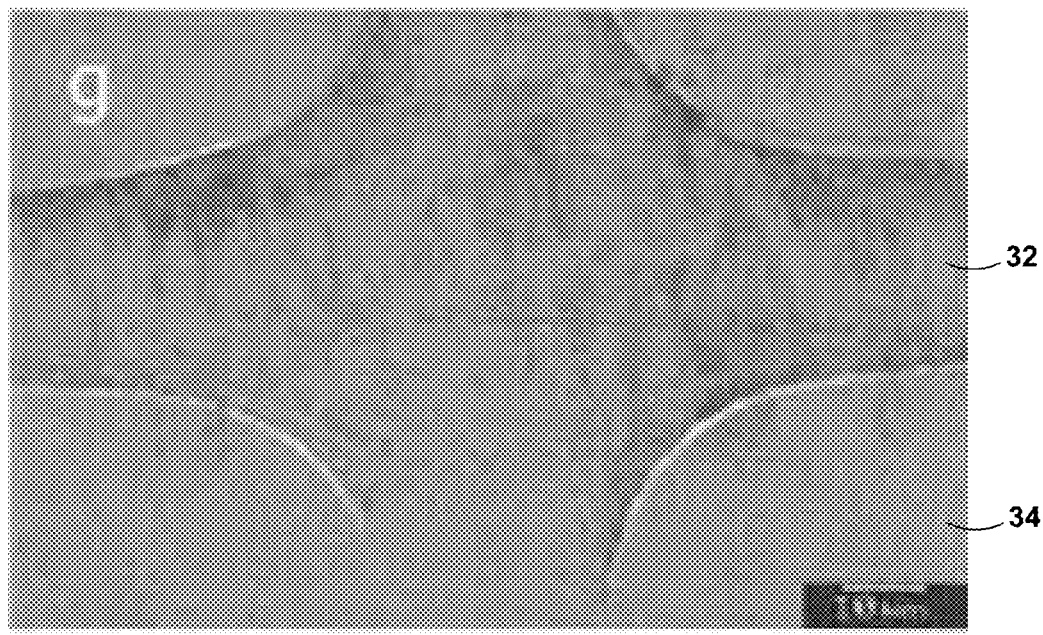
FIG. 10C is a further magnified SEM image showing rectangular patterns imprinted in the Hf-based amorphous alloy sample.

FIG. 10C is a further magnified SEM image showing rectangular patterns imprinted in the Hf-based amorphous alloy sample 28 of FIG. 10A. The image of FIG. 10C presents additional evidence of homogeneous deformation induced during cold-plastic forming of the sample 28. As shown in the image of FIG. 10C, the smoothness of surfaces in the as-cast state of sample 28 is maintained after imprinting of trench portions 32 to form rectangles 34 of sample 28. The image shows sharply defined edges of the imprinted pattern that substantially lack cracks or other observable shear bands or shear localization.

Figure 10D:
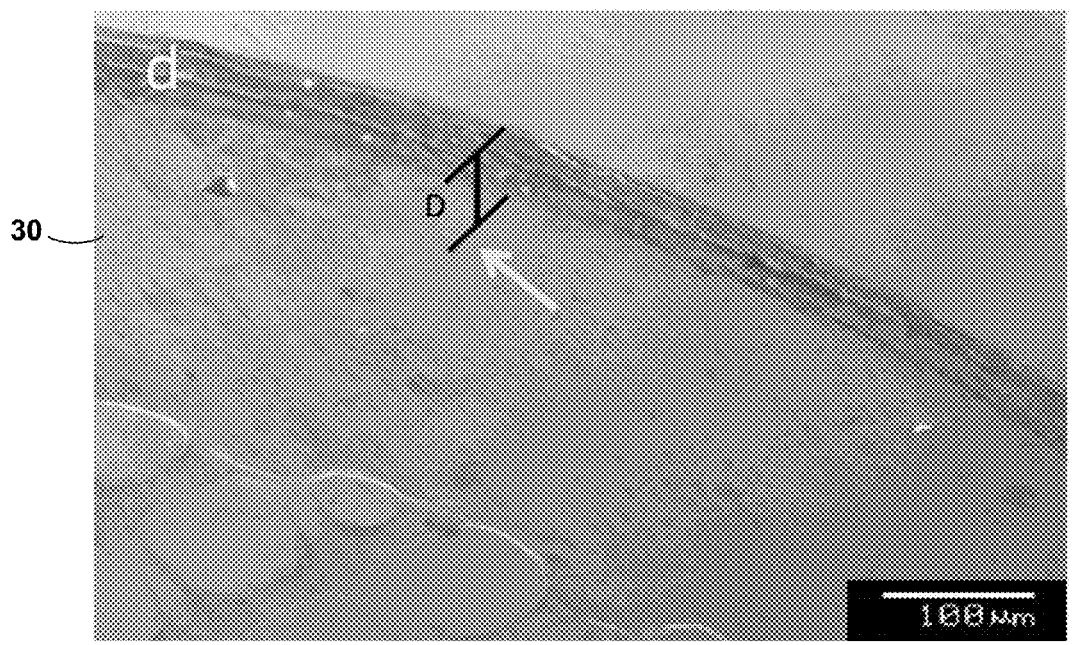
FIG. 10D is an SEM image showing a lateral edge of the imprinted Hf-based amorphous alloy sample.

FIG. 10D is an SEM image showing a lateral edge of the imprinted Hf-based amorphous alloy sample. Lateral region 30 along a lateral edge of sample 28 is shown in the image of FIG. 10D, along with a clear and sharp edge of depth "D" produced by compressive loading with tungsten die 22. An exterior surface of the sample 28 was deformed normal to the surface direction with about 22 tm in depth D (marked by arrow), which is substantially similar (e.g., the same or similar) to the thickness of the tungsten die utilized to plastically deform the material. In the example of FIG. 10D, depth "d" of lateral region 30 was about 44 µm.The depth D of homogeneous deformation of the Hf-based amorphous alloy sample 28 during cold plastic forming is presented in the chart of FIG. 10E.

Figure 10E:
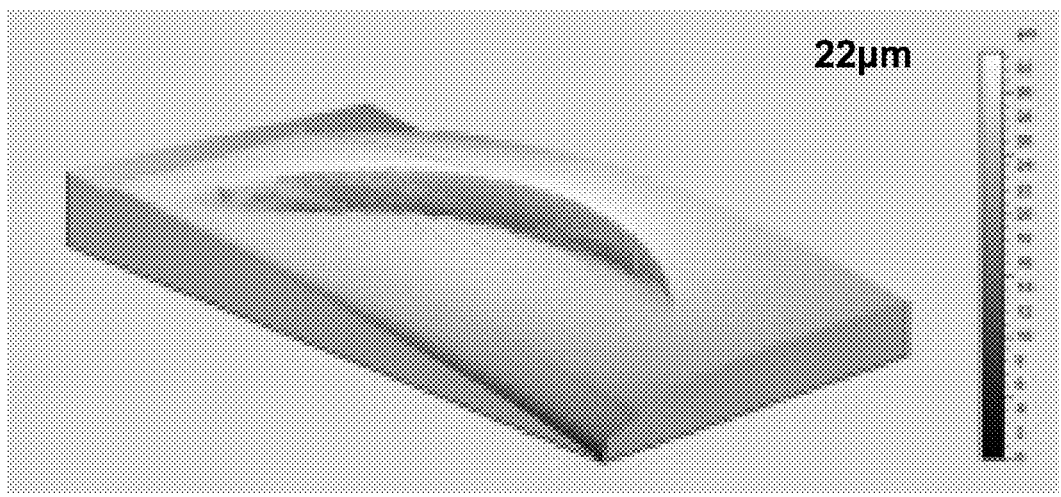
FIG. 10E is a three-dimensional topological profilemeter image of a lateral edge of the shape imprinted into the Hf-based amorphous alloy sample of FIG. 10D.

FIG. 10E is a three-dimensional topological profilemeter image of a lateral edge of the shape imprinted into the Hf-based amorphous alloy sample of FIG. 10D. Surface topological analysis for FIG. 10E (among other Figures referenced below) was performed by a Hommelwerke T8000 profilemeter. The profile indicates differences in heights of sample 28 after having been plastically and homogeneously deformed. As shown in the chart of FIG. 10E, there is clear definition between heights of sample 28, indicating smooth surfaces of sample 28 and sharply patterned edges without cracks or other observable shear bands.

Figure 10F:
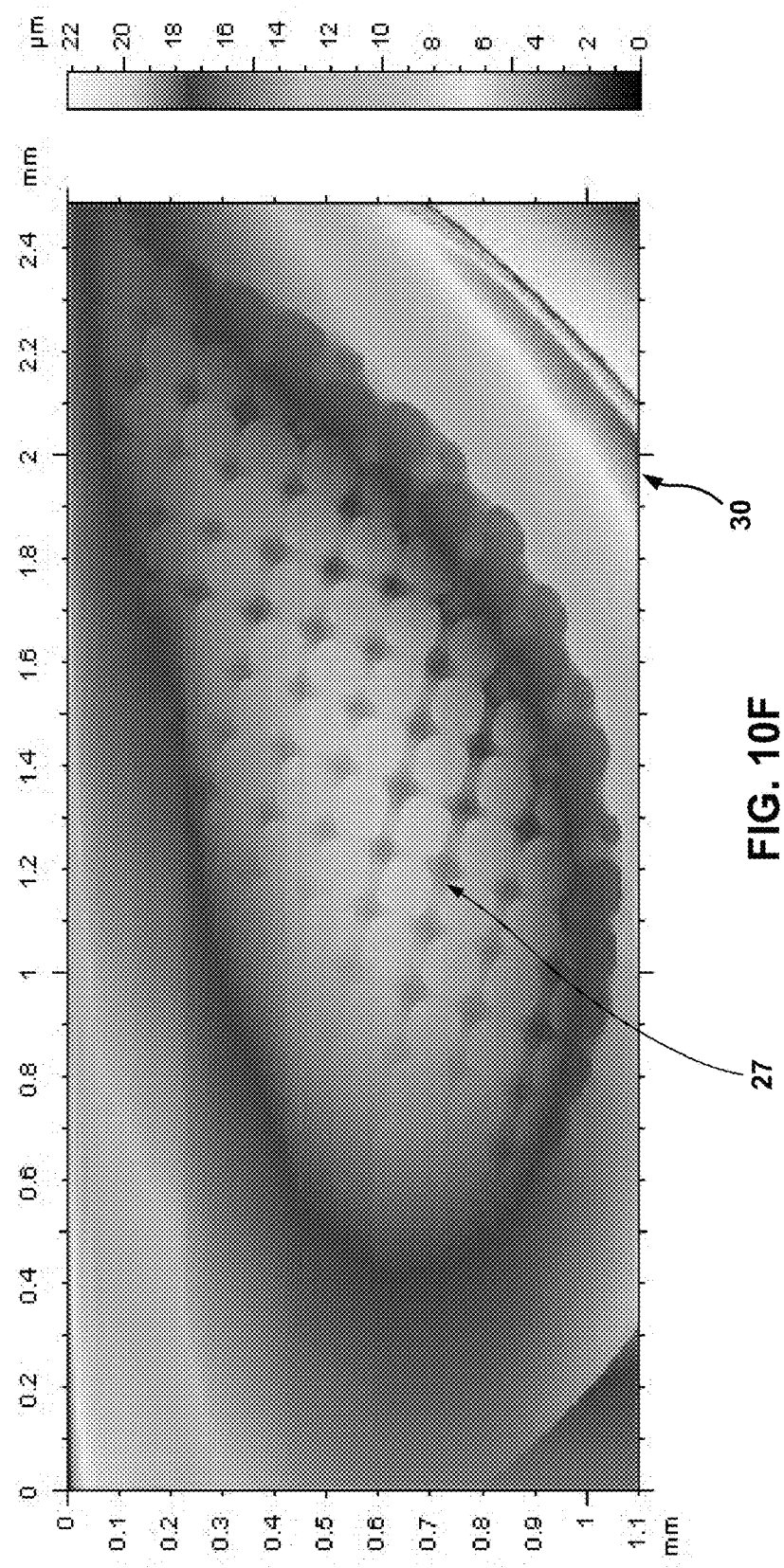
FIG. 10F is another profilemeter image of the imprinted surface of the example Hf-based amorphous alloy.

FIG. 10F is another profilemeter image of the imprinted surface of the example Hf-based amorphous alloy. The pattern imprinted by tungsten die 22 into sample 28 is shown as a shaded depth profile (indicated in microns). The image of FIG. 10F shows that the extent of deformation is largest in lateral region 30, where the change in height due to compression by lateral portion 24 of tungsten die 22 is about 22 μm. In comparison, for example, an extent of deformation in grid region 27 of sample 28 is less than lateral region 30. For example, in general, portions of sample 28 deformed by struts 20 of die 22 were plastically deformed by about 2 μm. Accordingly, stress was not uniformly distributed over the imprinted surface area of sample 28. The scale of the profilemeter image of FIG. 10F measures a greatest extent of depression at 0 μm and a least extent of depression by die 22 at 22 82 m. Differences in the depth of depression of an amorphous alloy (such as sample 28) by a die (such as tungsten die 22) may be due to differences in contact surface area between different portions of the die and alloy.

In general, stress may not be uniformly distributed over the imprinted surface area of an amorphous alloy. An external load (P) is balanced by an internal resisting force of the alloy (∫σdA), where σ is the stress normal to the surface of the alloy and A is the cross-sectional area of the contact surface between the object applying stress (e.g., the die) and the alloy. When the volume of a sample that is strained remains constant during plastic deformation, a logarithmic strain also may be defined in reference to the initial and final dimensions of the strained object, according to the following equations: $\varepsilon = \ln(L/L_0) = \ln(A_0/A)$, where $\varepsilon$ is the logarithmic strain, L is a final length of a strained sample, $L_0$ is the initial length of the sample before straining, $A_0$ is an initial area of a surface of the sample before straining, and A is the final area of the same surface of the sample after straining. Thus, for example, a larger contact area between a die and amorphous alloy along a continuous lateral portion of a die may cause more plastic deformation than a strut portion of the die, which has a smaller contact area.

Figure 10G:
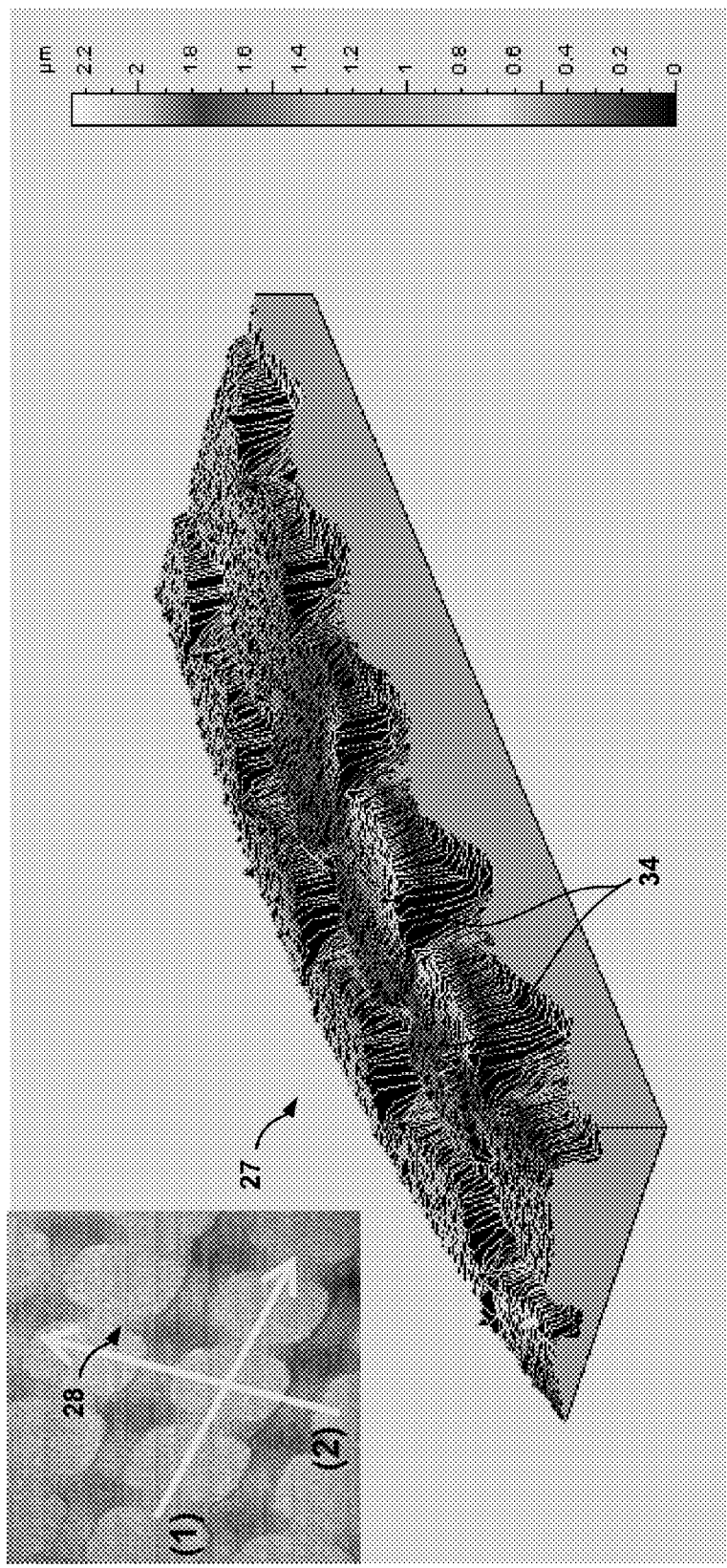
FIG. 10G is a three-dimensional surface topology image showing a rectangular pattern imprinted on the example Hf-based amorphous alloy.

FIG. 10G is a three-dimensional surface topology image showing a rectangular pattern imprinted on the example Hf-based amorphous alloy. The maximum depth difference obtained from surface topological scanning analyses of grid portion 26 of Hf-based amorphous alloy sample 28 was about 2.2 μm. The image of FIG. 10G shows a plurality of rectangles 34 formed in sample 28 after uniaxial compression by tungsten die 22.

Figure 10H:
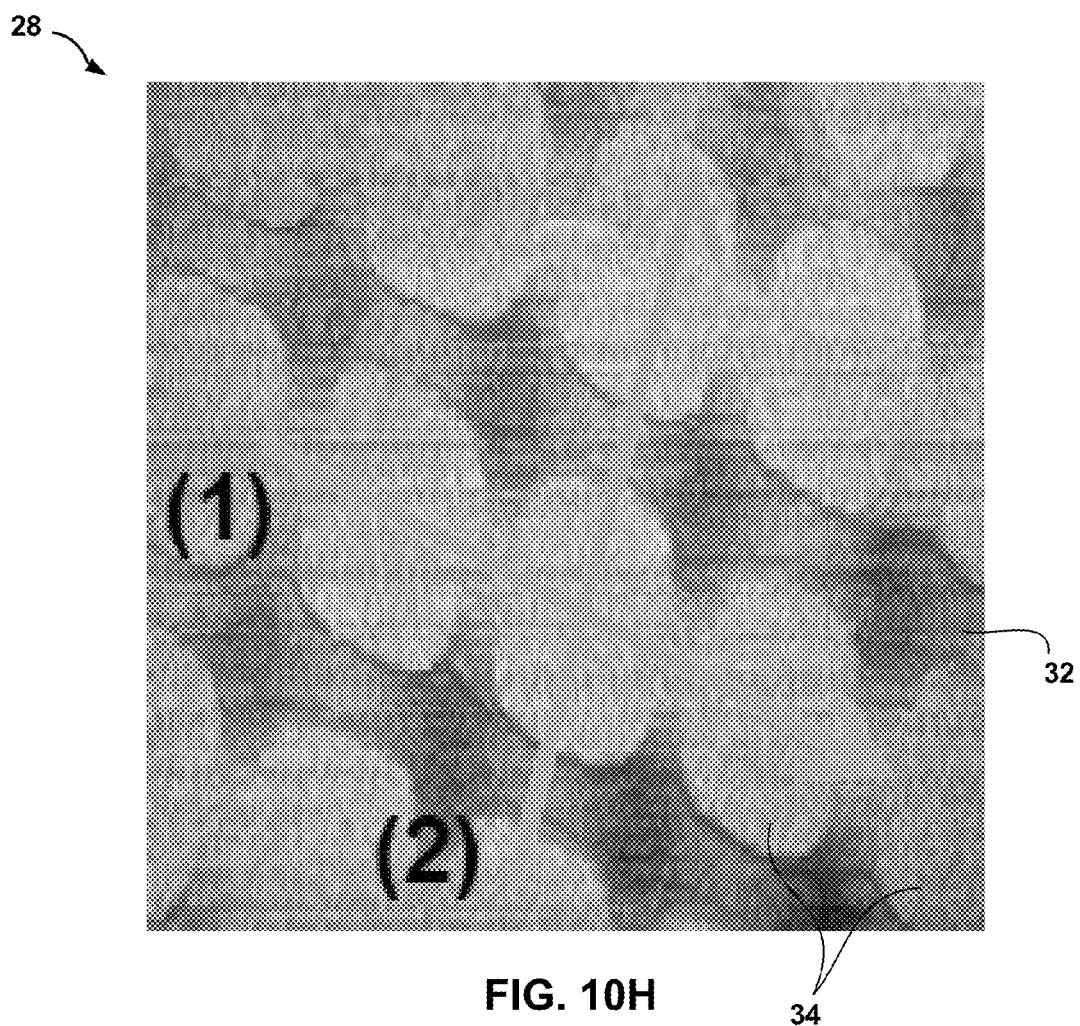
FIG. 10H is an image of an example Hf-based amorphous alloy sample showing arrows corresponding to directional line scans.

FIG. 10H is an image of an example Hf-based amorphous alloy sample showing arrows corresponding to directional line scans. Height intensity profiles were measured along center portions of rectangles 34 in sample 28. Thus, a first line scan of sample 28 was performed in the direction of arrow (1), and a second line scan was performed in the direction of arrow (2).

Figure 10I:
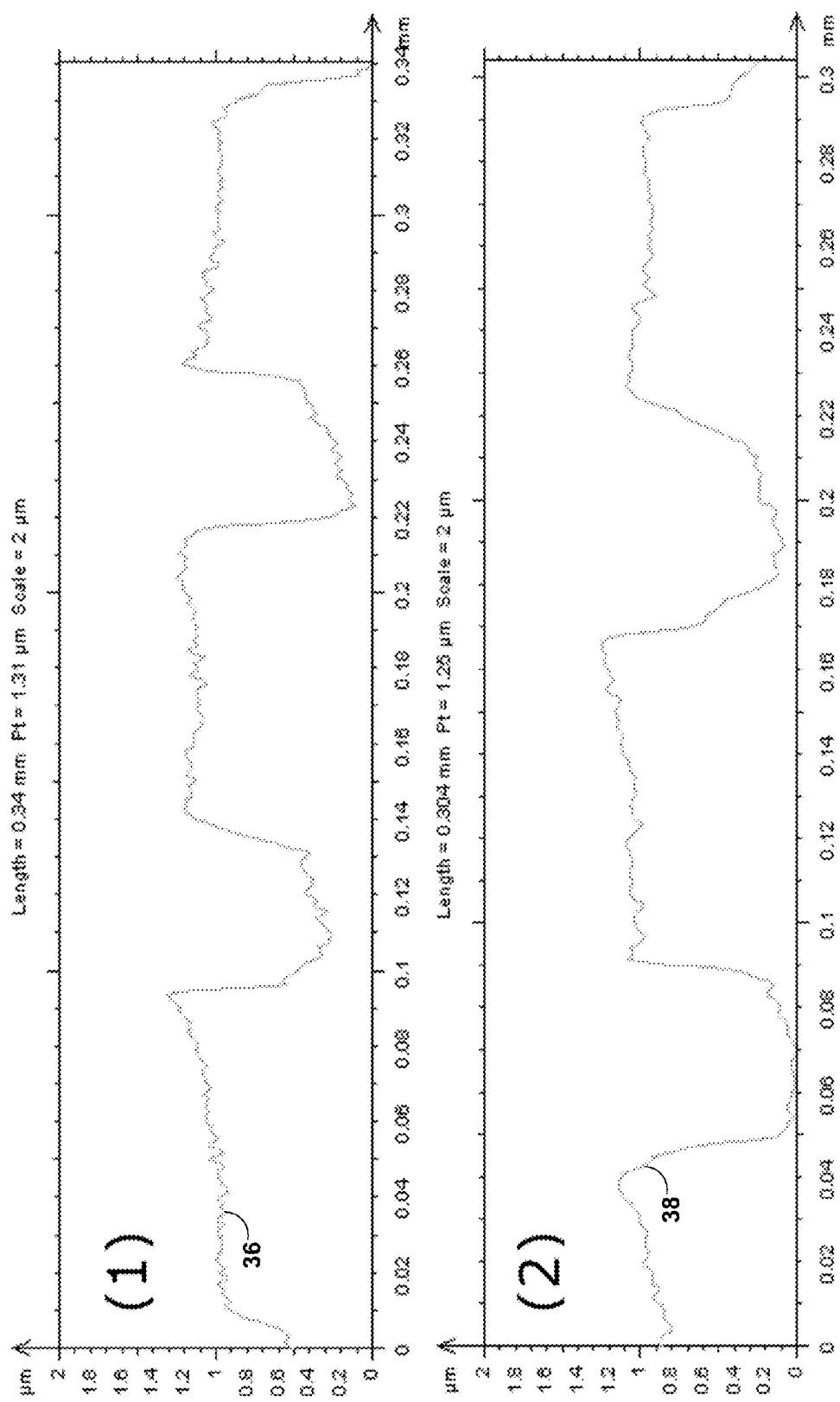
FIG. 10I is an image showing height intensity profiles of two line scans of the example Hf-based amorphous alloy.

FIG. 10I is an image showing height intensity profiles of two line scans of the example Hf-based amorphous alloy. As shown in FIG. 10I, a curve 36 shows a height intensity profile of Hf-based amorphous alloy sample 28 extracted from a line scan analysis in the direction of arrow (1) shown in FIG. 10H. Further, a curve 38 shows a height intensity profile of Hf-based amorphous alloy sample 28 extracted from a line scan analysis in the direction of arrow (2) shown in FIG. 10H. The results of the respective scans show a difference in depth along center portions of rectangles 34 of the imprinted pattern in sample 28. Curves 36 and 38 show that the depth difference at center portions of rectangles 34 of the imprinted rectangular pattern is less than or equal to about 1.2 μm. Thus, the difference in depth of trench portions 32 formed by struts 20 of tungsten die 22 and a top portion of rectangles 34 of sample 28, along center portions of rectangles 34, was less than or equal to about 1.2 μm.

Example 6

Figure 11A:
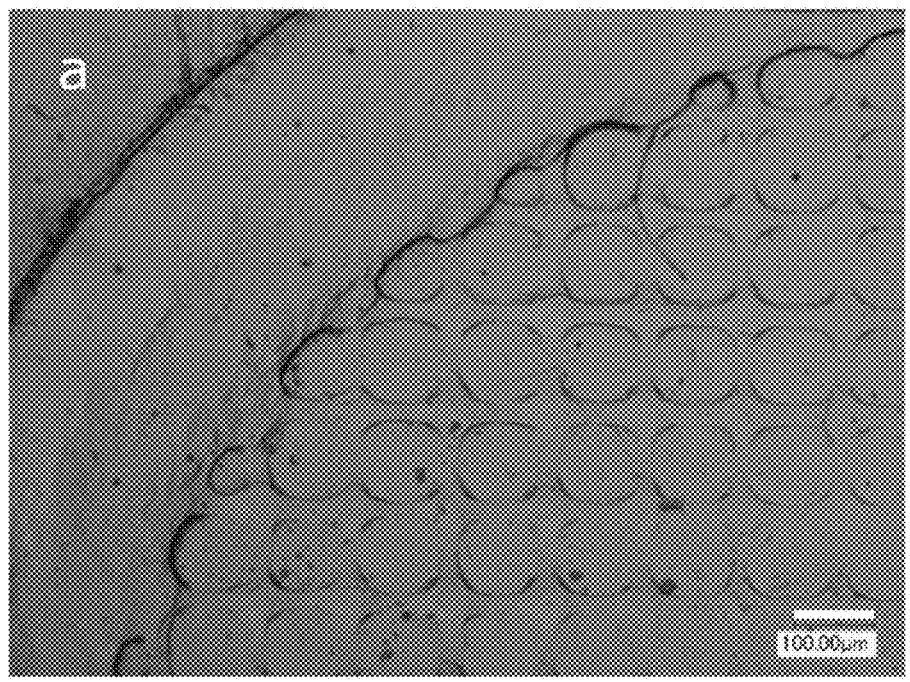
FIGS. 11A and 11B are optical images of an example copper foil plastically deformed by an example Hf-based amorphous alloy die.
Figure 11B:
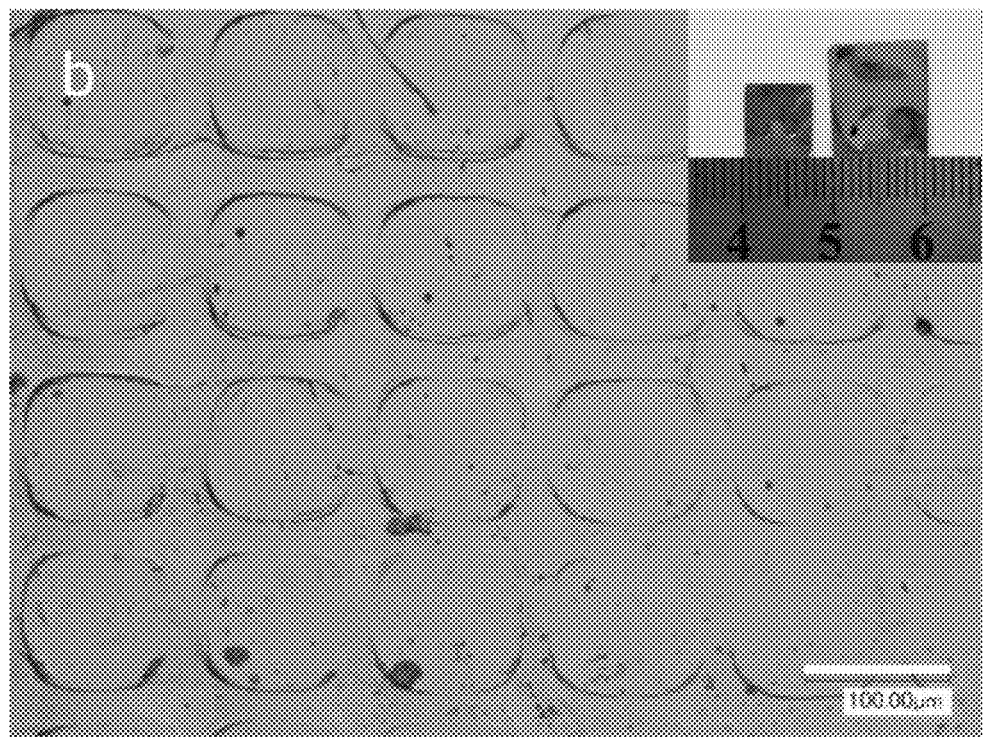

FIGS. 11A and 11B are optical images of an example copper foil plastically deformed by an example Hf-based amorphous alloy die. Cavities in the Cu foil formed in a rectangular-shaped pattern were produced by using Hf-based amorphous alloy sample 28, described above with reference to EXAMPLE 5, as a die to imprint the Cu foil. In this example, the example Cu foil was rectangular and prepared with a width of about 10 mm and a thickness of about 30 μm. An inset image in FIG. 11B shows example rectangular-shaped samples of Cu foil before being imprinted to form the patterned Cu foil shown in FIGS. 10A and 10B.

The Cu foil was placed between Hf-based amorphous alloy sample 28 and a WC platen of the described Instron-type electro-mechanical testing apparatus, such that sample 28 acted as a die to imprint the Cu foil. The example Cu foil shown in FIGS. 11A and 11B was uniaxially loaded at ambient to The WC platens of the Instron apparatus were about 6 mm in thickness and 38 mm in diameter. The images of FIGS. 11A and 11B show sharply defined edges in patterns produced by depression of the Cu foil. The pattern imprinted in the Cu foil is an inverted replica of the features of the die formed from the patterned bulk Hf-based amorphous alloy sample 28, shown in FIGS. 10A and 10B (among other Figures).

Figure 12A:
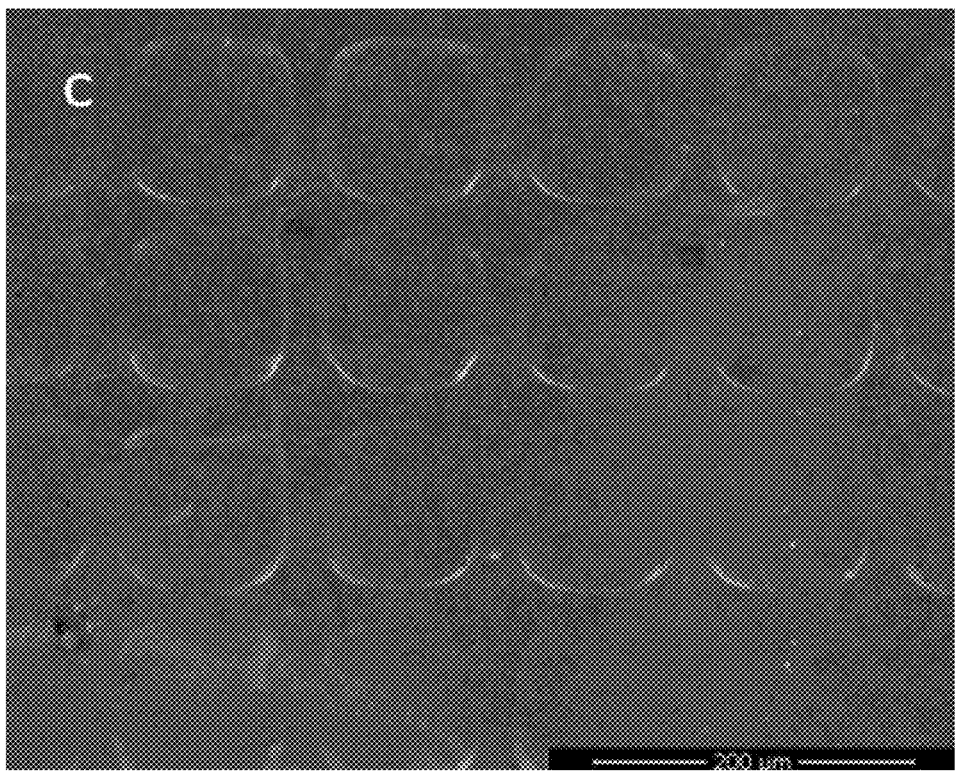
FIGS. 12A and 12B are SEM images of the example patterned copper foil shown in FIGS. 11A and 11B.
Figure 12B:
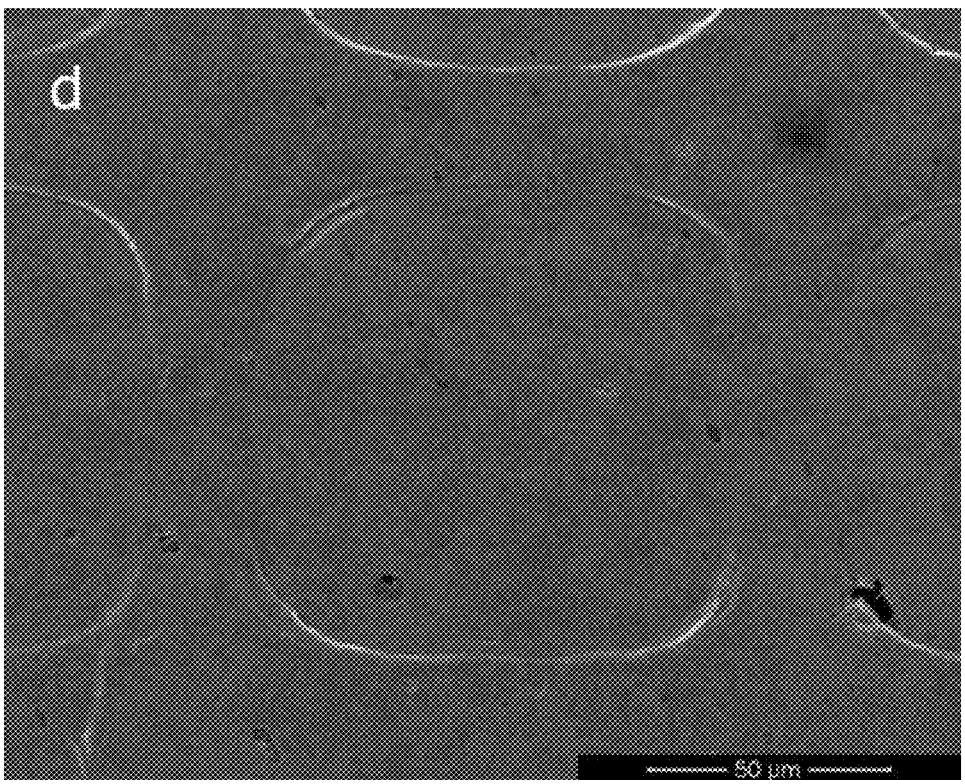

FIGS. 12A and 12B are SEM images of the example patterned copper foil shown in FIGS. 11A and 11B. Like the optical images of FIGS. 11A and 11B, the SEM images of FIGS. 12A and 12B show sharply defined edges in patterns produced by depression of the Cu foil.

Example 7

Figure 13A:
FIGS. 13A and 13B are optical images of an example Zr-based metallic glass plastically deformed by an example Hf-based amorphous alloy die.
Figure 13B:
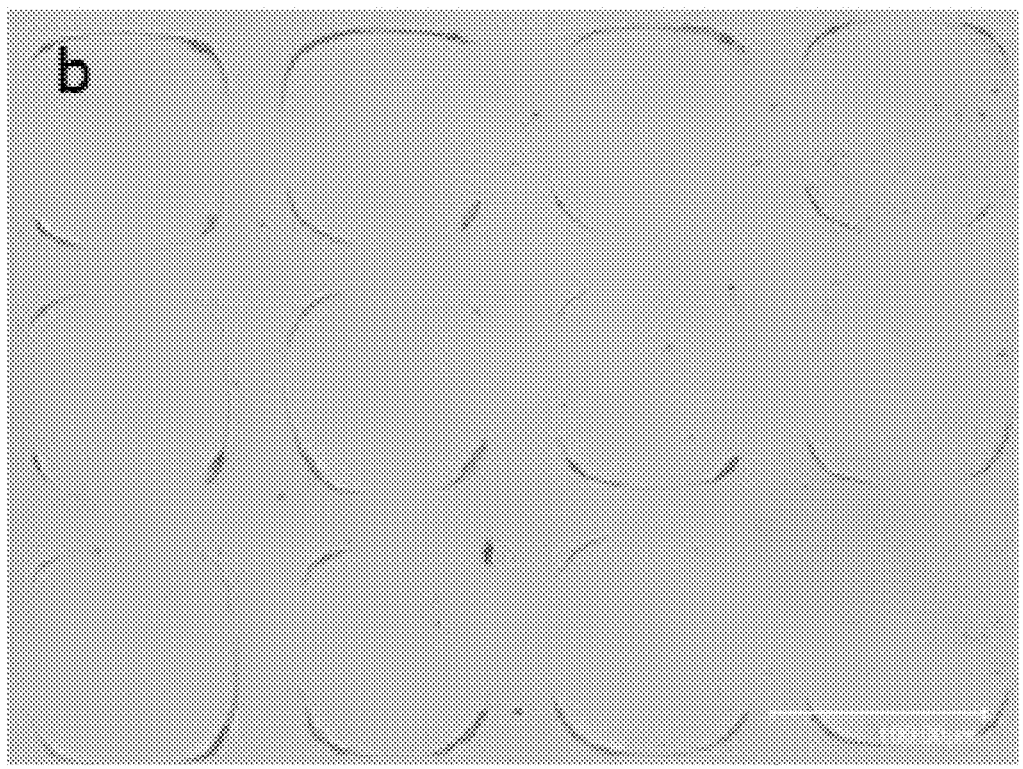

FIGS. 13A and 13B are optical images of an example Zr-based metallic glass plastically deformed by an example Hf-based amorphous alloy die. Cavities in the Zr-based metallic glass formed in a rectangular-shaped pattern were produced by using Hf-based amorphous alloy sample 28, described above with reference to EXAMPLE 5, as a die to imprint the Zr-based metallic glass. The Zr-based metallic glass had a nominal composition of $Zr_{55}Cu_{20}Ni_{10}Al_{10}Ti_5$ (at. %). Rectangular samples of the Zr-based metallic glass were prepared having a width of about 10 mm and a thickness of about 100 μm.

In this example, a sample of the Zr-based metallic glass was placed between the Hf-based amorphous alloy sample 28 and a WC platen of the described Instron apparatus, such that sample 28 acted as a die to imprint the Zr-based metallic glass. The Zr-based metallic glass sample shown in FIGS. 13A and 13B was uniaxially loaded at ambient temperature at a strain rate of $1.5 \times 10^{-5} s^{-1}$ up to 75% of the yield strength of the Zr-based metallic glass (1453 MPa). The images of FIGS. 13A and 13B likewise show sharply defined edges in patterns produced by depression of the Zr-based metallic glass. Again, the pattern imprinted in the Zr-based metallic glass is an inverted replica of the features of the die formed from the patterned bulk Hf-based amorphous alloy sample 28, shown in FIGS. 10A and 10B (among other Figures).

Example 8

Figure 14A:
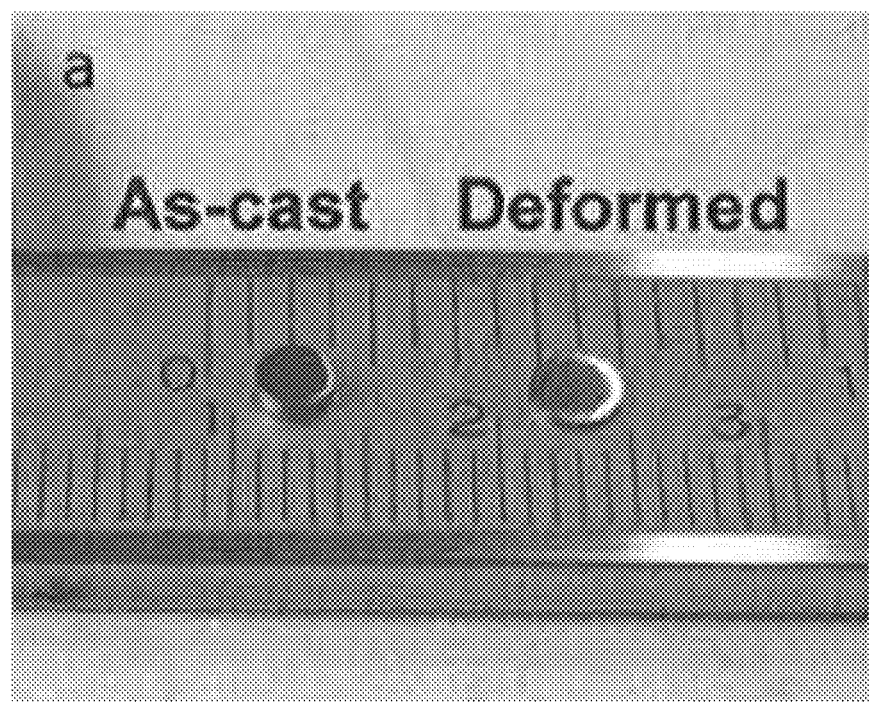
FIG. 14A is an optical image showing an as-cast Hf-based amorphous alloy sample and a cold-rolled Hf-based amorphous alloy sample.

FIG. 14A is an optical image showing an as-cast Hf-based amorphous alloy sample and a cold-rolled Hf-based amorphous alloy sample. The sample shown on the left side of the image is a rod shaped as-cast sample of Hf-based amorphous alloy having a nominal composition of $Hf_{44.5}Cu_{27}Ni_{13.5}Ti_5Al_{10}$ (at. %). The example as-cast sample had a thickness of about 1 mm and a diameter of about 3 mm. The sample shown on the right side of the image is a disc was produced after multiple passes of cold rolling of a rod-shaped sample shown on the left side of the image, according to the techniques disclosed above. For instance, rolled sample was lapped by Cu foil for the lubricant, and the sample and Cu foil were sandwiched by stainless steel plates. Strain of each rolled step was not maintained, but less than rolled strain was applied to sample and the sample itself was retained by plastic deformation of sample. The deformed disc sample had a thickness of about 0.56 mm (about a 44% total reduction in thickness) and a diameter of about 4 mm.

Figure 14B:
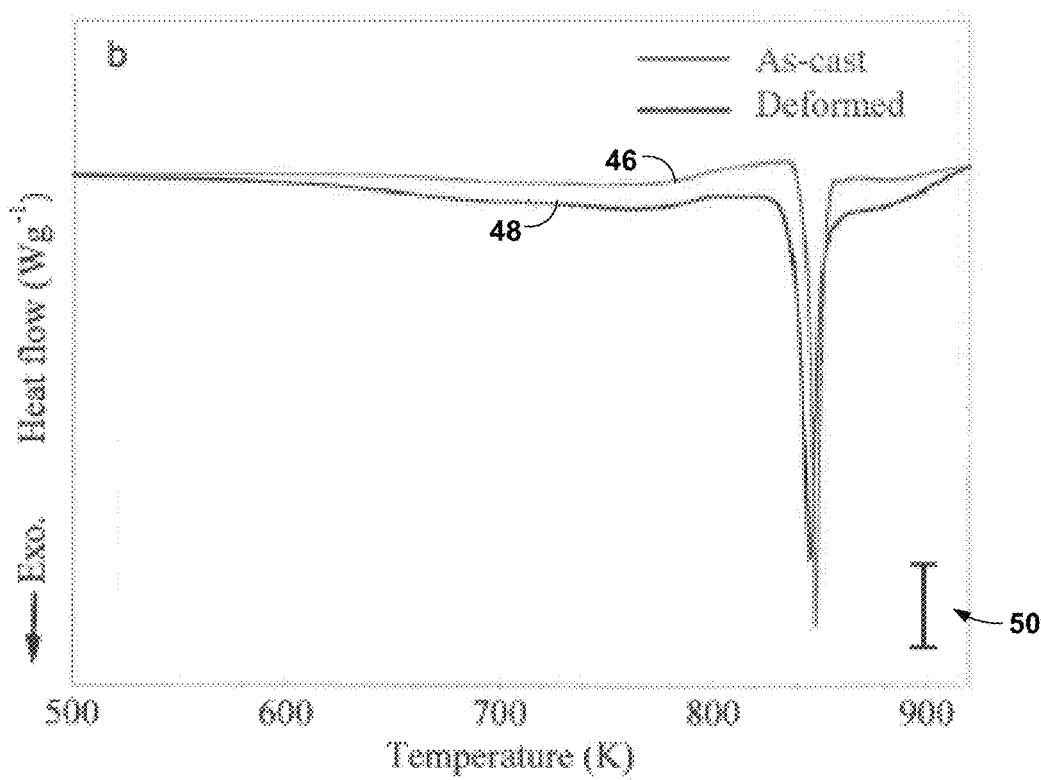
FIG. 14B is a chart illustrating scans of the samples of FIGS. 14A using a differential scanning calorimeter.

FIG. 14B is a chart illustrating scans of the samples of FIGS. 14A using a differential scanning calorimeter. Curve 46 in the chart of FIG. 14B shows results of a differential scanning calorimeter (DSC) scan of the as-cast Hf-based amorphous alloy sample from FIG. 14A, while curve 48 shows results of a DSC scan of the deformed (cold-rolled) Hf-based amorphous alloy sample from FIG. 14A. A 40 Kelvin (K) per minute (min) heating rate was utilized for the scans of rolled samples, and a 10 Kelvin (K) per minute (min) heating rate was utilized for patterned samples. A scale bar 50 shown in the chart corresponds to 0.2 Watts (W)/gram (g). Thermal properties of the samples (among samples of other Examples discussed herein) were measured with a Perkin-Elmer Pyris-1 differential scanning calorimeter.

In this example, no crystallization may have occurred by deformation since the enthalpy of crystallization did not drop in the cold-rolled specimen, indicating that the amorphous nature was maintained.

As shown, the disclosed techniques allow for enhanced plasticity of typically brittle amorphous alloys by cold-rolling, in addition to other manners of straining disclosed. A low strain rate and constrained geometry (e.g., a plane strain condition) induced by multiple passes each imparting small increments of deformation may result in large plastic strain of an amorphous alloy, while substantially preventing shear localization.

As shown by the foregoing examples, the disclosed technique for forming a homogenously deformed amorphous alloy die and utilizing the die to imprint patterns (e.g., micro-patterns) into other materials may have a wide range of possible applications. For example, the disclosed amorphous alloy dies may be used to imprint, without limitation, micro-electromechanical systems (MEMS), nano-electromechanical systems (NEMS), biomedical implants, precision microparts, surgical tools, micromachines, gears, tweezers, actuators, beams, pillars, pipes, square donuts, wavy structures, gears, microscale mechanical parts, springs, or flexible living hinges. Various examples have been described. These and other examples are within the scope of the following claims.

The invention claimed is:

1. A method comprising:
straining an amorphous alloy at about 25° C. to plastically and homogeneously deform at least a portion of the amorphous alloy to form a deformed amorphous alloy, wherein at least an exterior surface of the deformed amorphous alloy is substantially free of shear bands,
wherein the amorphous alloy is strained at a strain rate of less than about $9\times10^{-5}s^{-1}$,
wherein the amorphous alloy is strained by applying a force to the amorphous alloy to achieve a stress corresponding to between about 50% and about 95% of the yield strength of the amorphous alloy, and
wherein the amorphous alloy is strained with a patterned die to form one or more cavities in the amorphous alloy.

2. The method of claim 1, wherein the amorphous alloy is strained by uniaxial compressive loading or uniaxial cyclic loading.

3. The method of claim 1, wherein the patterned die comprises a pattern selected from at least one of a square, rectangle, circle, diamond or wave.

4. The method of claim 1, wherein the patterned die comprises at least one of tungsten (W), molybdenum (Mo), ruthenium (Ru), carbon (C), carbon nanotubes, carbon fiber, or graphene.

5. The method of claim 1, wherein the amorphous alloy comprises a metallic glass with a glass transition temperature greater than about 100° C.

6. The method of claim 5, wherein the metallic glass comprises at least one of Cu, Ni, hafnium (Hf), or zirconium (Zr).

7. The method of claim 5, wherein the metallic glass comprises about 44.5 atomic percent (at. %) Hf, about 27 at. % Cu, about 13.5 at. % Ni, about 5 at. % Ti, and about 10 at. % Al ($Hf_{44.5}Cu_{27}Ni_{13.5}Ti_5Al_{10}$).

8. The method of claim 1, wherein the amorphous alloy lacks a glass transition.

9. The method of claim 8, wherein the amorphous alloy comprises at least one of iron (Fe) or aluminum (Al).

10. The method of claim 1, further comprising plastically deforming a second material with a die of the deformed amorphous alloy, wherein the second material comprises at least one of a metal or an amorphous alloy.

* * * * *